US012270383B2

(12) United States Patent
Aitken

(10) Patent No.: US 12,270,383 B2
(45) Date of Patent: *Apr. 8, 2025

(54) MULTIPLE UP-TOWER LIFTING APPLIANCES ON WIND TURBINES

(71) Applicant: LiftWerx Solutions Inc., Cambridge (CA)

(72) Inventor: Glen D. Aitken, Guelph (CA)

(73) Assignee: LiftWerx Solutions Inc., Cambridge (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/652,245

(22) Filed: May 1, 2024

(65) Prior Publication Data
US 2024/0287969 A1    Aug. 29, 2024

Related U.S. Application Data

(63) Continuation of application No. 17/795,334, filed as application No. PCT/CA2021/050199 on Feb. 22, 2021, now Pat. No. 12,006,917.

(Continued)

(51) Int. Cl.
*F03D 80/50* (2016.01)
*B66C 1/10* (2006.01)
(Continued)

(52) U.S. Cl.
CPC .............. *F03D 80/50* (2016.05); *B66C 1/108* (2013.01); *B66C 23/207* (2013.01); *F03D 1/141* (2023.08);
(Continued)

(58) Field of Classification Search
CPC ........ F03D 1/141; F03D 13/10; F03D 13/139; F03D 80/50; F03D 80/881; F05B 2230/61;
(Continued)

(56) References Cited

U.S. PATENT DOCUMENTS 10,378,518 B2   8/2019   Fenger
2010/0021278 A1  1/2010   Stegemann et al.
(Continued)

FOREIGN PATENT DOCUMENTS

CA    2997876 A1    9/2018
CA    3012945 A1   10/2018
(Continued)

OTHER PUBLICATIONS

International Search Report and Written Opinion dated May 3, 2021 on PCT/CA2021/050199.
(Continued)

*Primary Examiner* — Matthew P Travers
(74) *Attorney, Agent, or Firm* — Brunet & Co. Ltd.; Robert Brunet; Hans Koenig

(57) ABSTRACT

A nacelle-mounted multiple-appliance lift system has a first lifting appliance and a second lifting appliance mounted in a nacelle of a wind turbine. The first and second lifting appliances are each mounted on main bearing housing securements, gearbox pillow blocks, or both the main bearing housing securements and the gearbox pillow blocks. The (Continued)

first and second lifting appliances share one or both of the main bearing housing securements and the gearbox pillow blocks.

6 Claims, 22 Drawing Sheets

Related U.S. Application Data

(60) Provisional application No. 62/982,957, filed on Feb. 28, 2020.

(51) Int. Cl.
*B66C 23/18* (2006.01)
*B66C 23/20* (2006.01)
*F03D 1/00* (2006.01)
*F03D 13/10* (2016.01)

(52) U.S. Cl.
CPC .......... *F03D 13/139* (2023.08); *B66C 23/185* (2013.01); *F05B 2230/61* (2013.01); *F05B 2230/80* (2013.01); *F05B 2240/14* (2013.01)

(58) Field of Classification Search
CPC .. F05B 2230/80; F05B 2240/14; B66C 1/108; B66C 23/185; B66C 23/207
See application file for complete search history.

(56) References Cited

U.S. PATENT DOCUMENTS

| | | |
|---|---|---|
| 2014/0037456 A1 | 2/2014 | Erno et al. |
| 2015/0086367 A1 | 3/2015 | Holloway et al. |
| 2017/0022966 A1 | 1/2017 | Therkildsen |
| 2019/0203700 A1 | 7/2019 | Numajiri |
| 2020/0378368 A1 | 12/2020 | Aitken |

FOREIGN PATENT DOCUMENTS

| | | |
|---|---|---|
| CA | 3096280 A1 | 11/2019 |
| EP | 3204639 A4 | 5/2018 |

OTHER PUBLICATIONS

International Preliminary Report on Patentability dated Jun. 8, 2022 on PCT/CA2021/050199.
Office action dated Oct. 16, 2023 on Canadian application 3,166,109.
Extended European Search Report dated Feb. 20, 2024 on European application 21759009.0.
Office action date Feb. 7, 2024 on U.S. Appl. No. 17/795,334.
Notice of allowance dated Apr. 17, 2024 on U.S. Appl. No. 17/795,334.

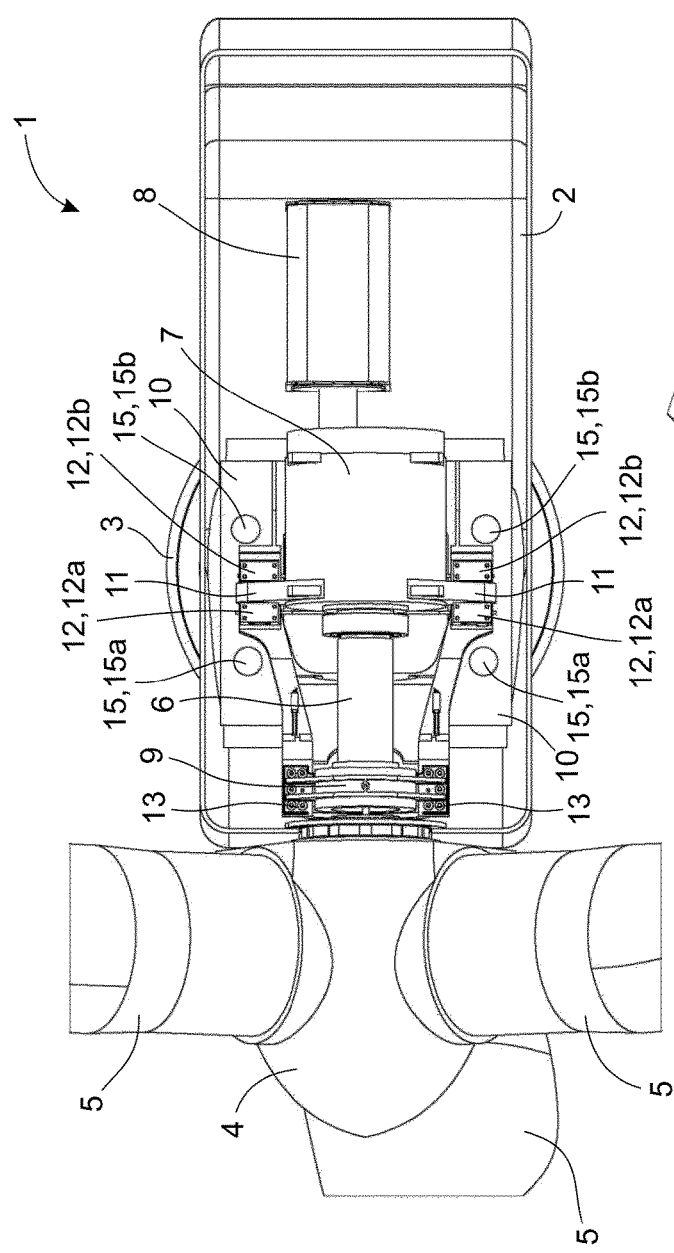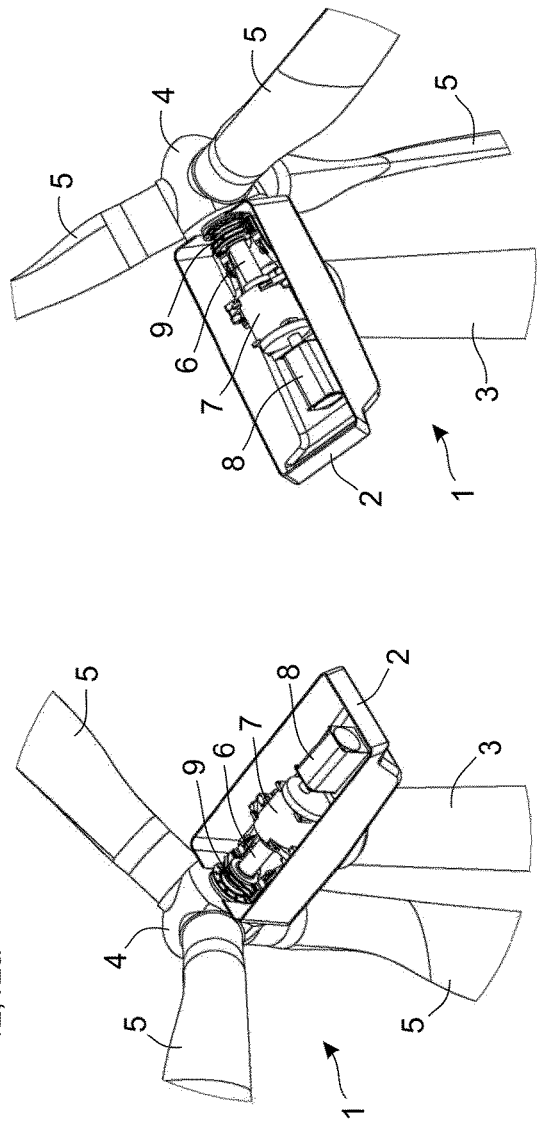

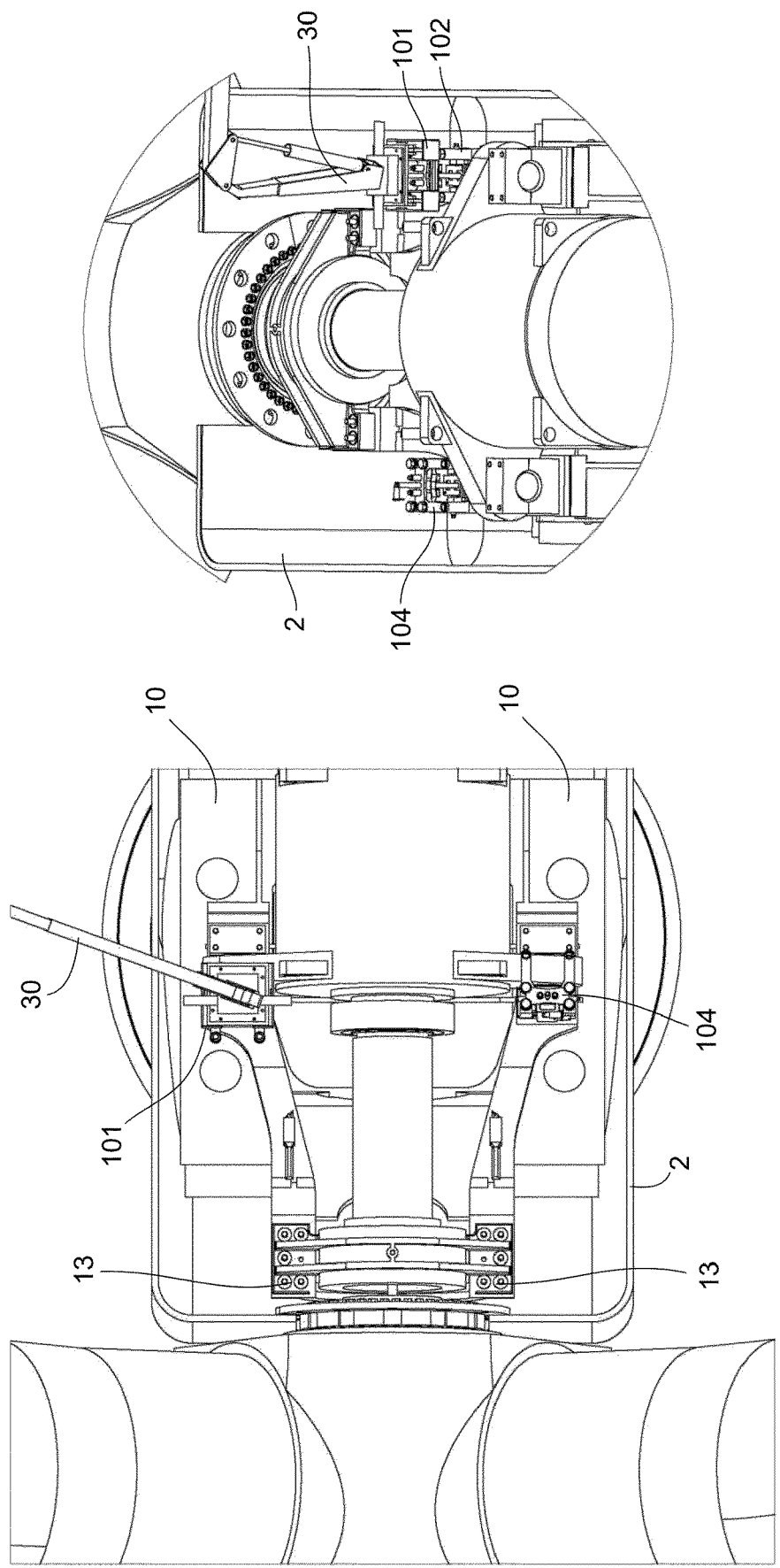

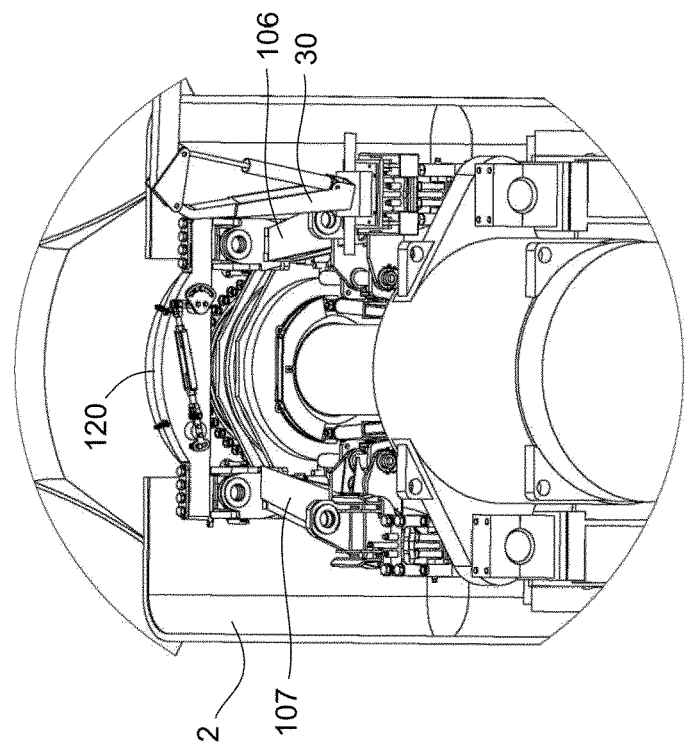
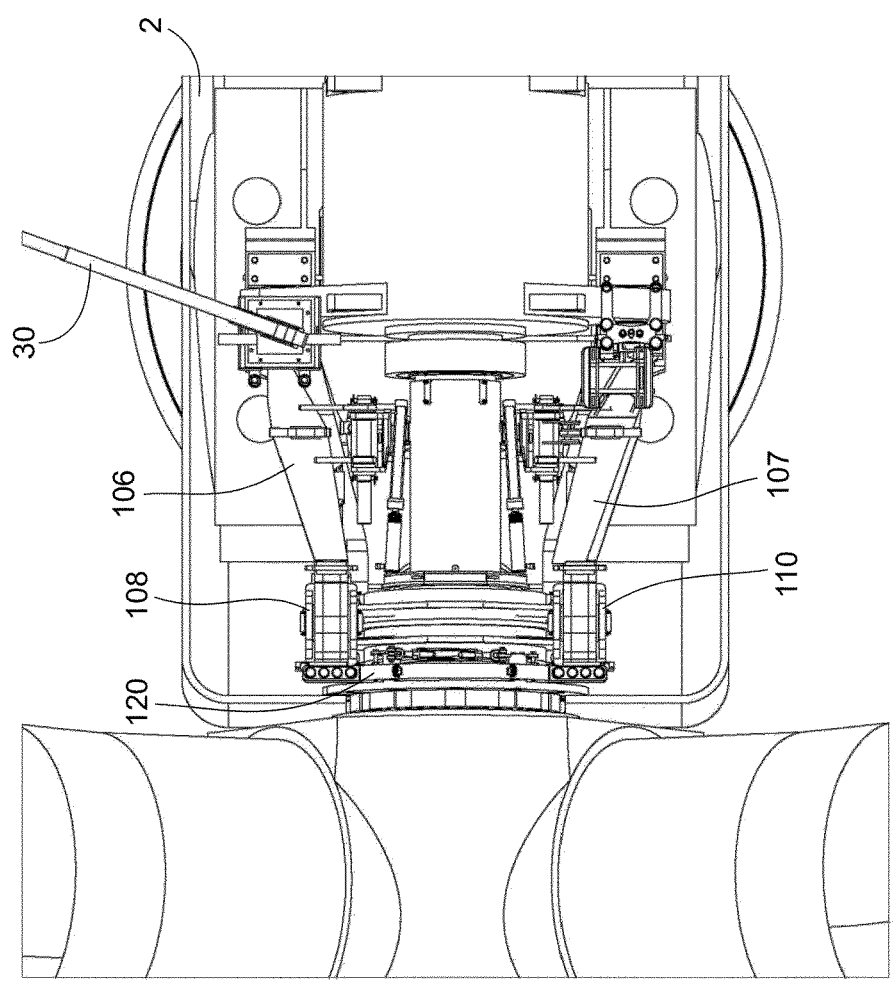
Fig. 5B
Fig. 5A

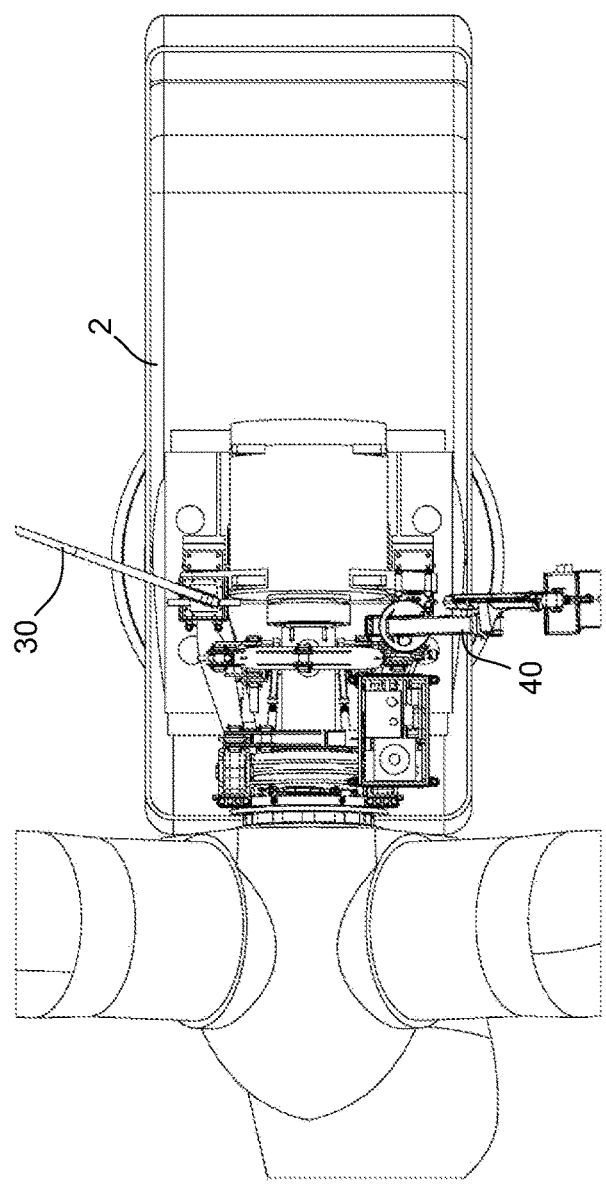
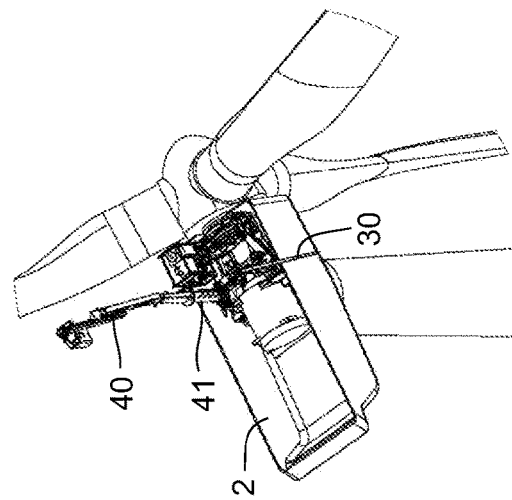
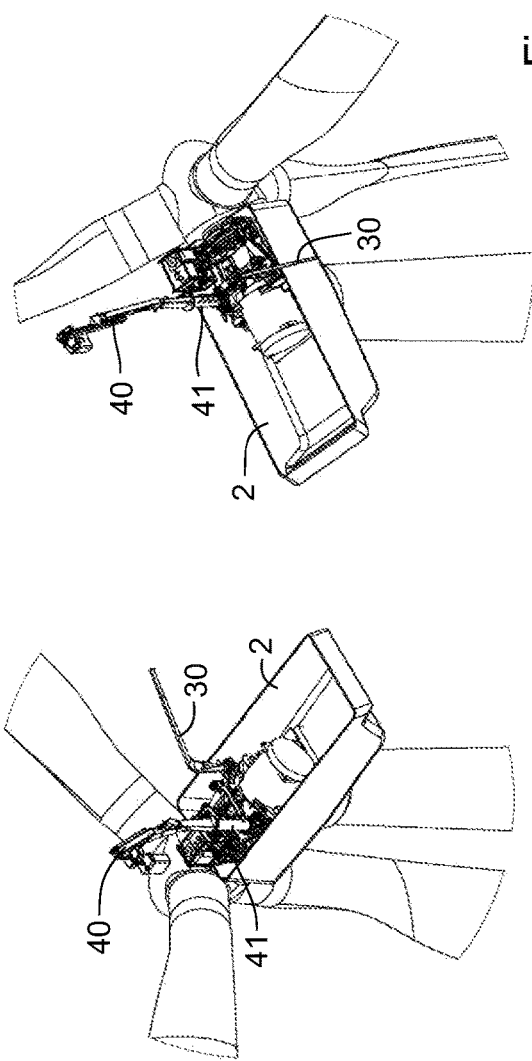
Fig. 7A
Fig. 7B
Fig. 7C

MULTIPLE UP-TOWER LIFTING APPLIANCES ON WIND TURBINES

CROSS-REFERENCE TO RELATED APPLICATIONS

This application is a continuation of U.S. Ser. No. 17/795,334 filed Jul. 26, 2022, which is a national entry of International application PCT/CA2021/050199 filed Feb. 22, 2021, which claims the benefit of U.S. Provisional Patent Application Ser. No. 62/982,957 filed Feb. 28, 2020, the entire contents of both of all of which are herein incorporated by reference.

FIELD

This application relates to wind turbines, in particular to a nacelle-mounted multiple-appliance lift system on a wind turbine that provides multiple up-tower lifting appliances in a nacelle of the wind turbine.

BACKGROUND

Installation and repair of wind turbine components, for example the main bearing, the main shaft, rotor blades and the like, require the use of cranes to lift the components up to and down from the nacelle. Large ground-supported cranes may be used, but such cranes are expensive to use and transport to wind turbine sites. For this reason, lift systems mounted in the nacelle of the wind turbine have become increasingly popular.

Various light-duty service cranes that can be mounted up-tower in the nacelle are known in the art. Such light-duty cranes are typically provided with a dedicated mounting platform, and are used to lift various items up to and down from the nacelle. However, the light-duty service crane is insufficiently robust and improperly placed to effectively lift heavy wind turbine components such as the main bearing, the main shaft and the rotor blades. For this reason, the light-duty service crane may be used to lift the parts of another heavier-duty lifting appliance, which is then mounted somewhere in the nacelle. Even so, this other lifting appliance is also often insufficiently robust for certain tasks, but may be used to lift the parts of a yet heavier-duty lifting appliance up to and down from the nacelle, which must also be mounted somewhere in the nacelle. Unfortunately, there are very few structures in the nacelle capable of supporting such heavier-duty lifting appliances, and supporting multiple lifting appliances in the nacelle is problematic.

There remains a need for a system whereby multiple up-tower lifting appliances may be supported in the nacelle of a wind turbine.

SUMMARY

A nacelle-mounted multiple-appliance lift system comprises: a first lifting appliance mounted in a nacelle of a wind turbine on (i) at least one main bearing housing securement, (ii) at least one gearbox pillow block, or (iii) both the at least one main bearing housing securement and the at least one gearbox pillow blocks; and, a second lifting appliance mounted in the nacelle of the wind turbine on (i) the at least one main bearing housing securement, (ii) the at least one gearbox pillow block, or (iii) both the at least one main bearing housing securement and the at least one gearbox pillow block, the first and second lifting appliances sharing one or both of the at least one main bearing housing securement and the at least one gearbox pillow block.

The lift system permits utilizing multiple lifting appliances, in particular heavy-duty lifting appliances, mounted at the same time in the restricted space of the nacelle. The lift system is therefore capable of being used for a variety of different lifting tasks from the nacelle of the wind turbine, including but not limited to installation, removal and repair of wind turbine components such as the main bearing, the main shaft, the gearbox, the generator, the yaw drives and the rotor blades.

Further features will be described or will become apparent in the course of the following detailed description. It should be understood that each feature described herein may be utilized in any combination with any one or more of the other described features, and that each feature does not necessarily rely on the presence of another feature except where evident to one of skill in the art.

BRIEF DESCRIPTION OF THE DRAWINGS

For clearer understanding, preferred embodiments will now be described in detail by way of example, with reference to the accompanying drawings, in which:

FIG. 1A depicts a top view of a wind turbine with a lid of a nacelle removed and without any lifting appliances mounted in the nacelle;

FIG. 1B depicts a rear right side perspective view of the wind turbine of FIG. 1A;

FIG. 1C depicts a rear left side perspective view of the wind turbine of FIG. 1A;

FIG. 3D depicts a top view of the wind turbine of FIG. 3A magnified in the region showing the gearbox, main shaft and main bearing;

FIG. 3E depicts a rear perspective view of FIG. 3D;

FIG. 5A depicts a top view of the wind turbine of FIG. 4A having yet further parts of the lifting appliance support base of FIG. 2A mounted in the nacelle;

FIG. 5B depicts a rear perspective view of FIG. 5A;

FIG. 7A depicts a top view of the wind turbine of FIG. 1A having the lifting appliance support base of FIG. 2A mounted in the nacelle with the light-duty service crane and a medium-duty knuckle-boom crane mounted in the nacelle;

FIG. 7B depicts a rear right side perspective view of the wind turbine of FIG. 7A;

FIG. 7C depicts a rear left side perspective view of the wind turbine of FIG. 7A;

DETAILED DESCRIPTION

Figure 1D:
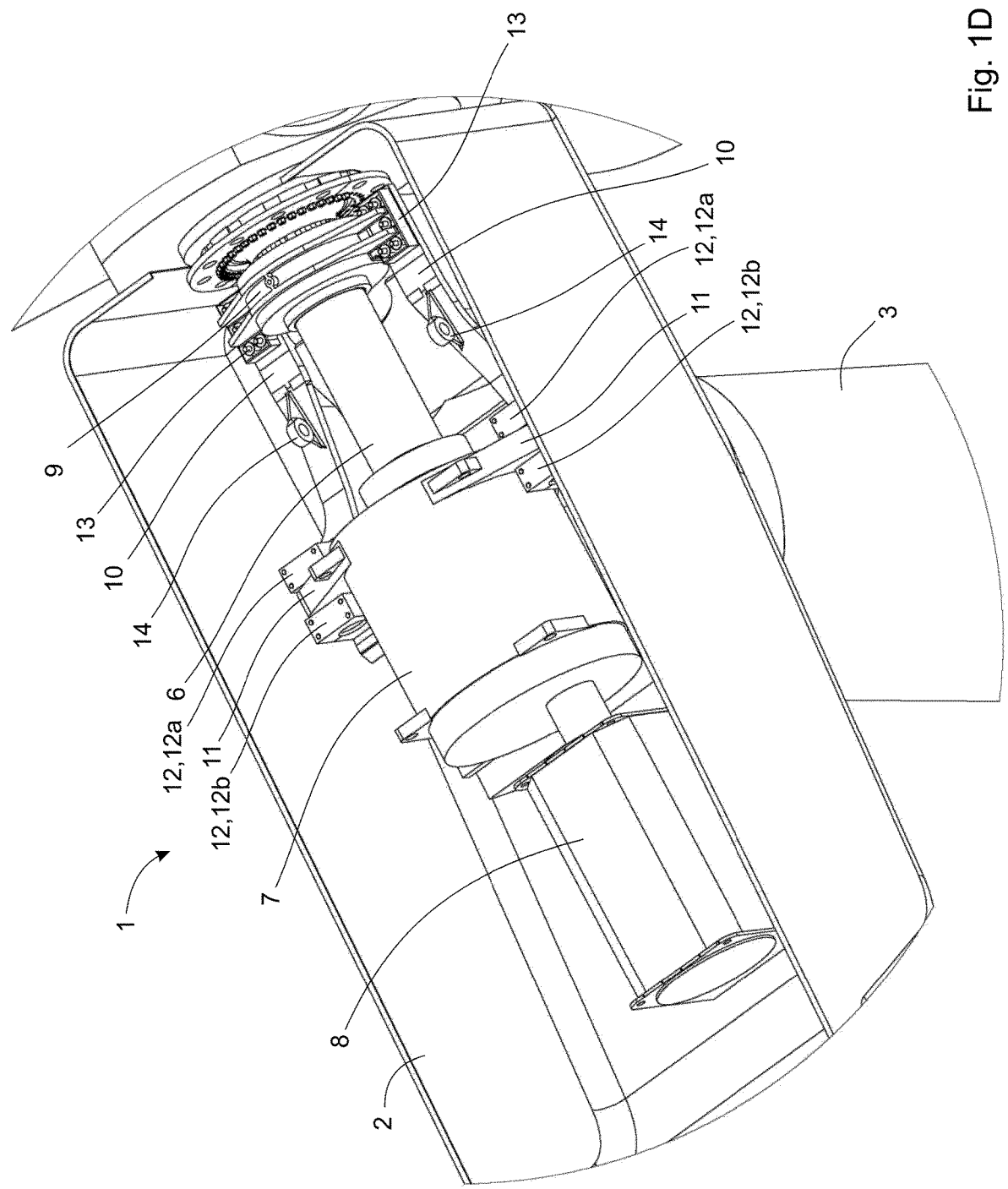
FIG. 1D depicts a magnified view of FIG. 1C.

A single lift system comprising a plurality of lifting appliances mounted at one or more common locations in a nacelle of a wind turbine provides a unified solution to many, if not all, lifting tasks required for the installation, removal and repair of wind turbine components. Some examples of suitable lifting appliances for use in the lift system are disclosed in WO 2019/100146 published May 31, 2019, WO 2019/213748 published Nov. 14, 2019, U.S. Ser. No. 16/552,072 filed Aug. 27, 2019 and U.S. Ser. No. 62/924,475 filed Oct. 22, 2019, the contents of all of which are herein incorporated by reference.

The plurality of lifting appliances comprises two, three, four or more lifting appliances. At a minimum, two of the plurality of lifting appliances share one or both of the at least one main bearing housing securement and the at least one gearbox pillow block. In some embodiments, two lifting appliances share both the at least one main bearing housing securements and the at least one gearbox pillow blocks. In addition to the at least one main bearing housing securement and the at least one gearbox pillow block, one or more of the lifting appliances may also be mounted somewhere else in the nacelle, for example to one or more of a dedicated mounting platform, a bedplate (e.g. at yaw drive pockets or lifting lugs), a torque arm or a generator housing. In some embodiments, a third lifting appliance may be mounted in the nacelle, for example on the at least one main bearing housing securement, the at least one gearbox pillow block, a dedicated mounting platform, a bedplate, a torque arm, a generator housing or any combination thereof. In one embodiment, the third lifting appliance is mounted on a dedicated mounting platform.

In some embodiments, at least two lifting appliances are supported together on a common support. In some embodiments, the common support is mounted on the at least one main bearing housing securement, on the at least one gearbox pillow block or on both the at least one main bearing housing securement and the at least one gearbox pillow support. In some embodiments, the common support is mounted on both the at least one main bearing housing securement and the at least one gearbox pillow block. In some embodiment, the common support is mounted on the at least one gearbox pillow block and in at least one yaw drive pocket.

The at least one main bearing housing securement is preferably at least two main bearing housing securements, for example two main bearing housing securements. The at least one gearbox pillow support is preferably at least two gearbox pillow supports, for example two, three or four gearbox pillow supports. The at least one yaw drive pocket is preferably at least two yaw drive pockets, for example two yaw drive pockets.

In some embodiments, the common support comprises at least two pillow block bridges secured to the gearbox pillow blocks and spaced apart transversely in the nacelle. In some embodiment, the common support comprises at least two main bearing supports secured to the main bearing housing securements and spaced apart transversely in the nacelle. In some embodiments, the common support comprises at least two longitudinal beams supported on the main bearing supports and the gearbox pillow blocks. In some embodiments, the common support comprises at least two longitudinally spaced apart transverse beams secured to and connecting the longitudinal beams. In some embodiments, the common support comprises at least two support bases for supporting the lifting appliances, each of the two support bases mounted on at least one of the longitudinal beams or at least one of the transverse beams.

In some embodiments, the common support comprises a first pair of vertically oriented pillow block bridges secured to the gearbox pillow blocks and spaced apart transversely in the nacelle. In some embodiments, the common support comprises a first transverse beam secured to and connecting the first pair of the transversely spaced apart pillow block bridges. In some embodiments, the common support comprises at least one first support base for supporting at least one of the lifting appliances, the at least one first support base mounted on the first transverse beam. In some embodiments, the common support comprises a second pair of vertically oriented pillow block bridges secured to the gearbox pillow blocks and spaced apart transversely in the nacelle. In some embodiments, the common support comprises a second transverse beam secured to and connecting the second pair of the transversely spaced apart pillow block bridges. In some embodiments, the common support comprises at least one second support base for supporting at least one of the lifting appliances, the at least one second support base mounted on the second transverse beam. In some embodiments, the common support comprises at least two support pillars connected to the first or second transverse beam, the support pillars mounted in the yaw drive pockets.

FIG. 1A to FIG. 1D illustrate a wind turbine 1 comprising a nacelle 2 (shown without a nacelle lid in place) rotationally mounted atop a tower 3. A rotor 4, having rotor blades 5, is mounted on a main drive shaft 6 at a front of the nacelle 2. The main drive shaft 6 extends longitudinally through the front of the nacelle 2 and operatively connects the rotor 4 to a gearbox 7 in the nacelle 2, the gearbox 7 operatively connected to a generator 8 also in the nacelle 2 and situated to the rear of the gearbox 7. The generator 8 is housed within a generator housing. At the front of and in the nacelle 2, the main drive shaft 6 is rotationally supported by a main bearing 9. Electrical power created by the generator 8 from operation of the wind turbine 1 may be transmitted through electrical cables to users remote from the wind turbine 1.

Inside the nacelle 2, the main bearing 9 and the gearbox 7 are supported on a bedplate 10. Torque arms 11 connected to the gearbox 7 and the bedplate 10 at the right and left sides of the gearbox 7 stabilize the gearbox 7 against twisting forces. The torque arms 11 are reinforced by gearbox pillow blocks 12 attached to the bedplate 10 in front of and behind the torque arms 11. The gearbox pillow blocks 12 comprise forward gearbox pillow blocks 12a and rearward gearbox pillow blocks 12b. The main bearing 9 is housed in a main bearing housing secured to the bedplate 10 by main bearing housing securements 13 at the right and left sides of the main bearing 9. The bedplate 10 further comprises lifting lugs 14 attached to the right and left sides of the bedplate 10. The nacelle 2 is rotatable atop the tower 3 by virtue of yaw drives (not shown) seated in yaw drive pockets 15 in the bedplate 10. The yaw drive pockets 15 comprise forward yaw drive pockets 15a and rearward yaw drive pockets 15b.

Figure 2A:
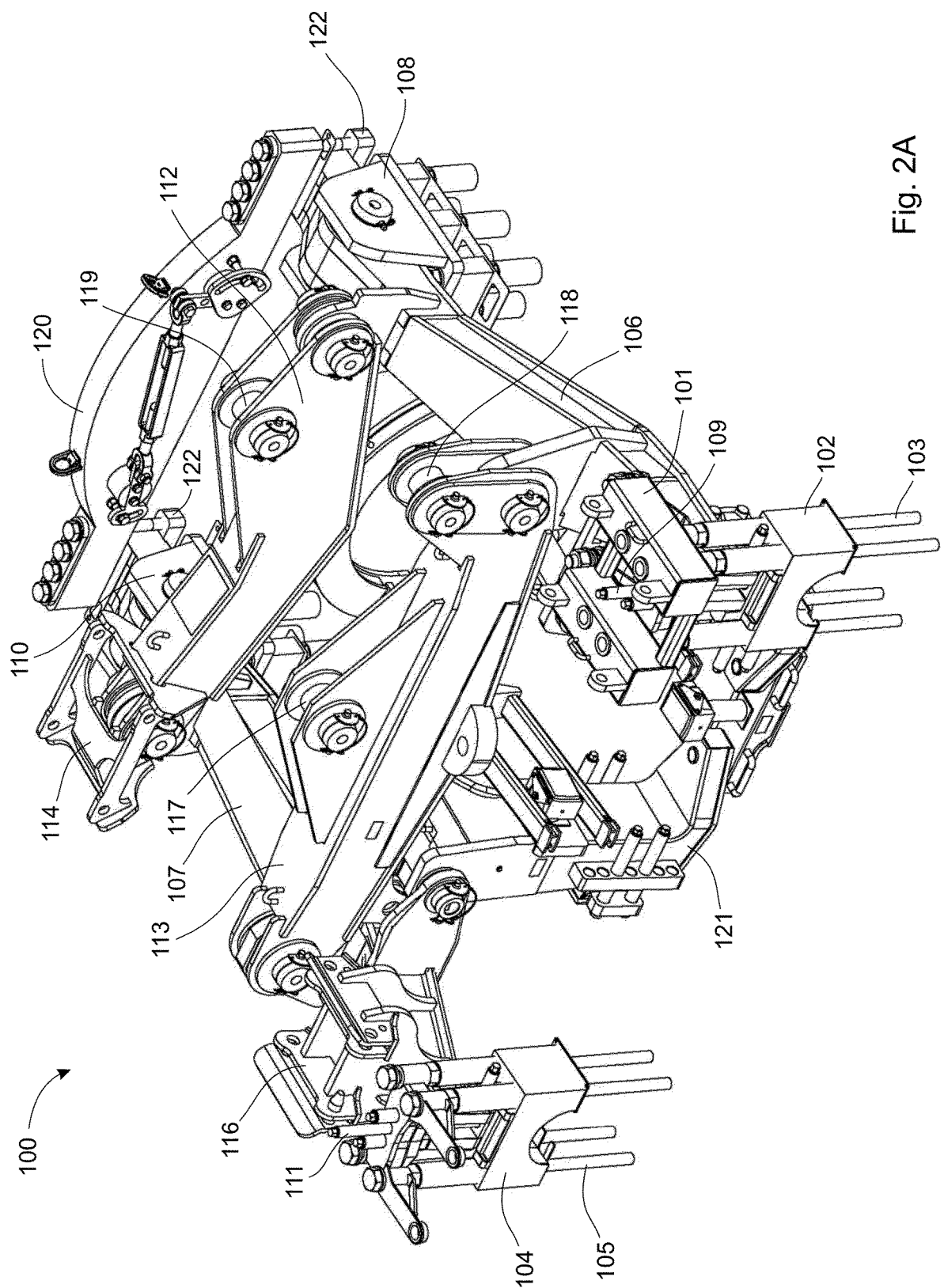
FIG. 2A depicts a rear left side perspective view of a lifting appliance support base mountable in the nacelle of the wind turbine of FIG. 1A.

With reference to FIG. 2A to FIG. 8E, to be able to install multiple lifting appliances in the nacelle 2, a lifting appliance support base 100 is mounted in the nacelle 2. The lifting appliance support base 100 comprises a plurality of parts that are installed in a particular order along with various lifting appliances including a light-duty service crane 30, a medium-duty knuckle-boom crane 40 and a heavy-duty jib crane 50. FIG. 2A to FIG. 2C illustrate the parts of the lifting appliance support base 100, while FIG. 3A to FIG. 8E illustrate the order in which the parts of the lifting appliance support base 100 and the various lifting appliances are mounted in the nacelle 2 to assemble a single multiple-appliance lift system 80.

Figure 2B:
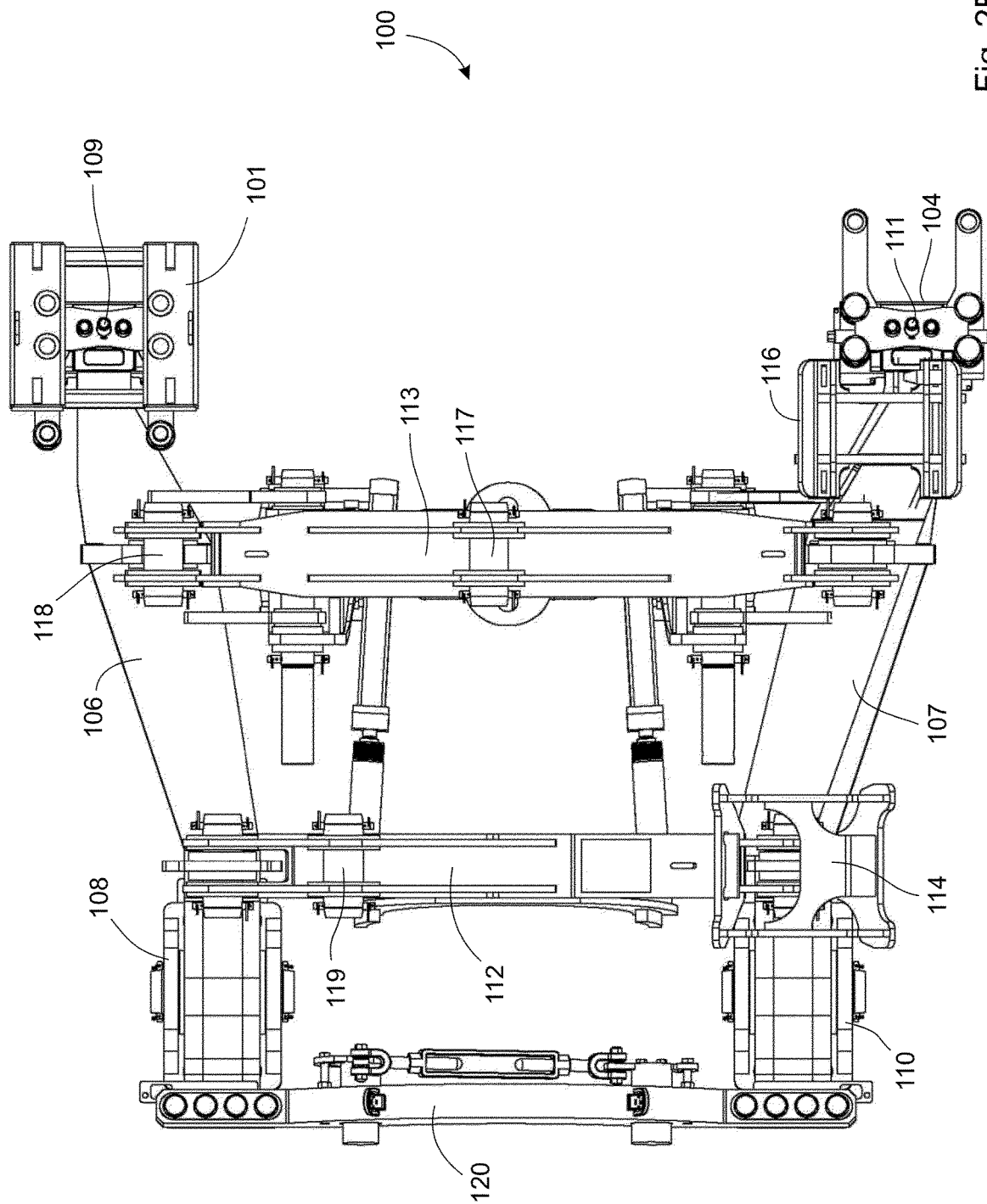
FIG. 2B depicts a top view of the base of FIG. 2A.
Figure 2C:
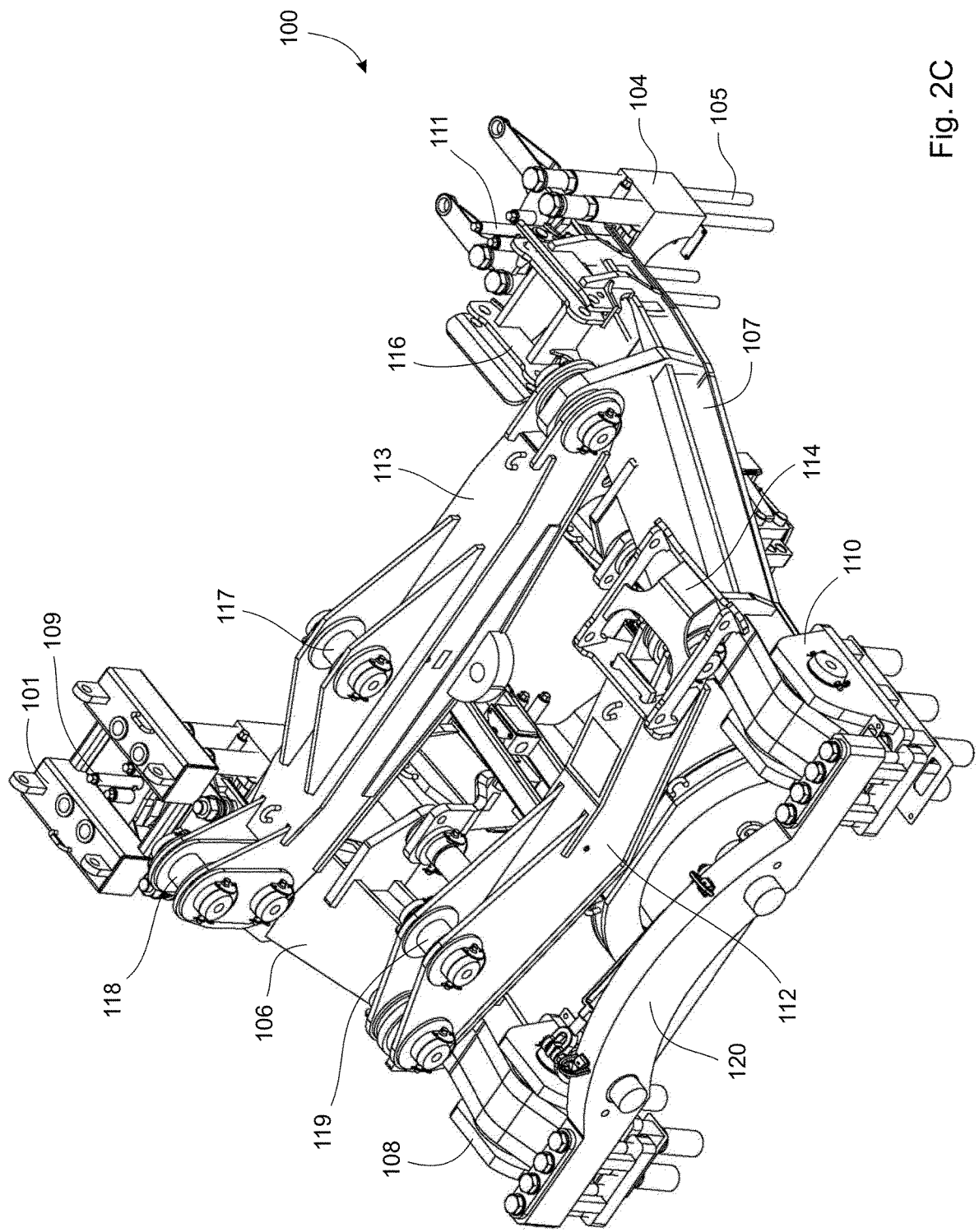
FIG. 2C depicts a front right side perspective view of the base of FIG. 2A.
Figure 3A:
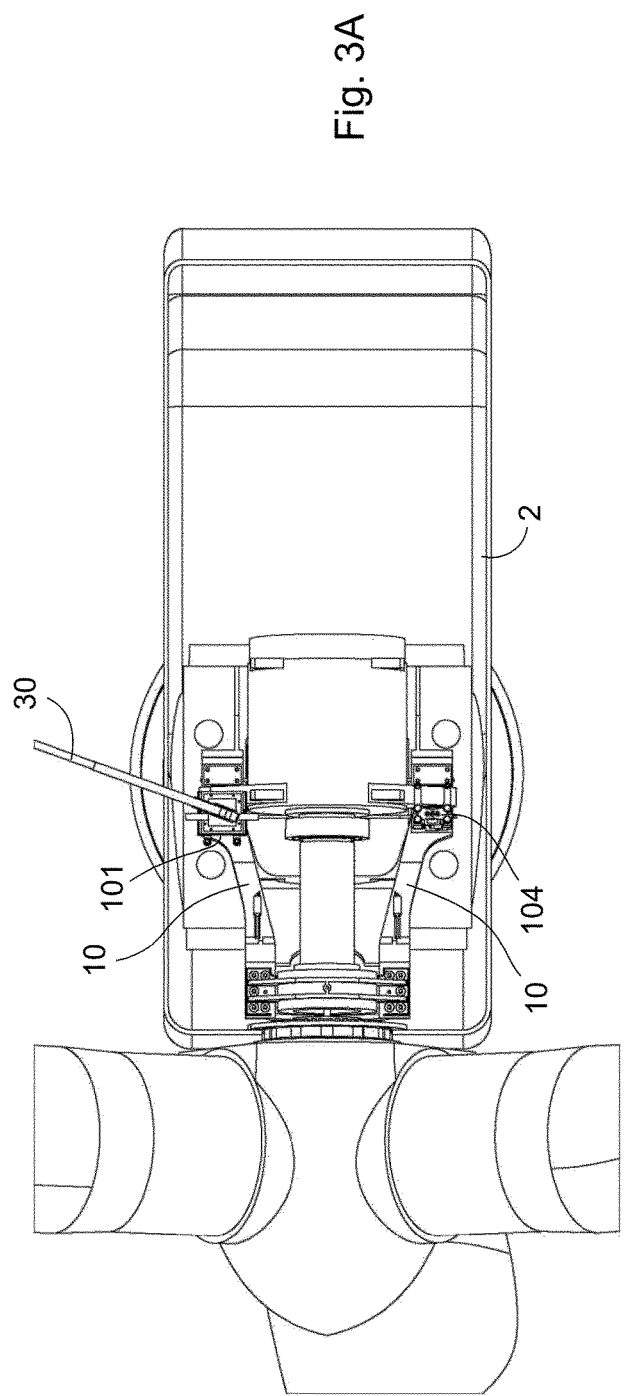
FIG. 3A depicts a top view of the wind turbine of FIG. 1A having parts of the lifting appliance support base of FIG. 2A mounted in the nacelle and having a light-duty service crane mounted thereon.
Figure 3C:
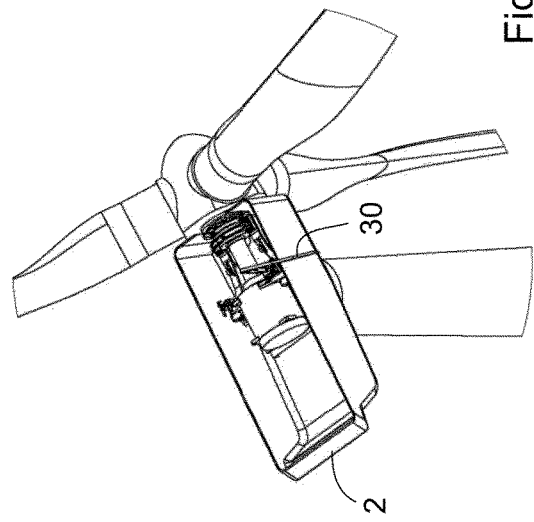
FIG. 3C depicts a rear left side perspective view of the wind turbine of FIG. 3A.
Figure 3B:
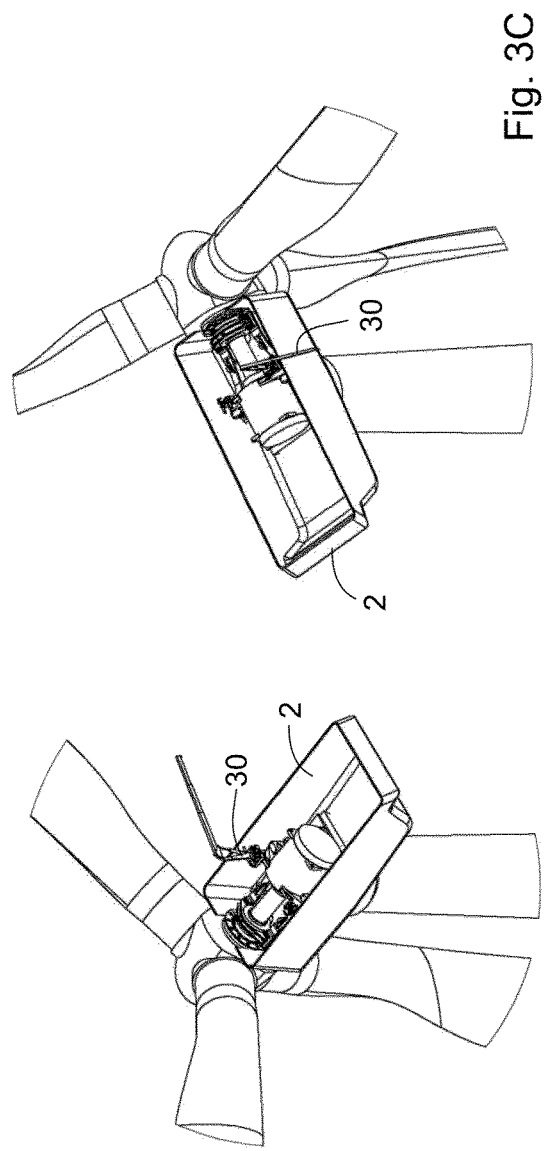
FIG. 3B depicts a rear right side perspective view of the wind turbine of FIG. 3A.

With specific reference to FIG. 2A to FIG. 2C, the lifting appliance support base 100 comprises a light-duty crane base 101, which supports the light-duty crane 30. The light-duty crane base 101 is attached to and supported on a first pillow block bridge 102, which is capable of being bolted to a lower portion of one of the gearbox pillow blocks (e.g. the gearbox pillow block forward of the torque arm on one side of the gearbox) by first pillow block studs 103 (only one labeled). An upper portion of the gearbox pillow block can be removed to be able to bolt the light-duty crane base to the lower portion of the gearbox pillow block. A second pillow block bridge 104, located on the opposite side of the nacelle from the first pillow block bridge 102, is likewise capable of being bolted to a lower portion of another of the gearbox pillow blocks (e.g. the gearbox pillow block forward of the torque arm on the other side of the gearbox) by second pillow block studs 105 (only one labeled).

The lifting appliance support base 100 further comprises a first longitudinal beam 106 and a second longitudinal beam 107, the first longitudinal beam 106 extending between the main bearing housing securement at one side of the main bearing and the forward gearbox pillow block on the same of nacelle as the main bearing housing securement. At the main bearing housing securement, the first longitudinal beam 106 is pinned in a first main bearing support 108, the first main bearing support 108 capable of being bolted to the main bearing housing securement on that side of the nacelle. At the forward gearbox pillow block, the first longitudinal beam 106 rests on the lower portion of the forward gearbox pillow block between the first pillow block studs 103, and first all-threaded pins 109 (only one labeled) threaded through the first pillow block bridge 102 serve to clamp a rearward end of the first longitudinal beam 106 to the gearbox pillow block. Likewise, the second longitudinal beam 107 is pinned in a second main bearing support 110 at the main bearing housing securement on the other side of the main bearing, the second main bearing support 110 capable of being bolted to the main bearing housing securement on the other side of the nacelle. At the forward gearbox pillow block on the other side of the nacelle, the second longitudinal beam 107 rests on the lower portion of the forward gearbox pillow block between the second pillow block studs 105, and second all-threaded pins 111 (only one labeled) threaded through the second pillow block bridge 104 serve to clamp a rearward end of the second longitudinal beam 107 to the gearbox pillow block on which the second longitudinal beam 107 rests.

Because the longitudinal beams are supported on the main bearing housing securements and the gearbox pillow blocks, and all of the lifting appliances except the light-duty service crane are supported on the longitudinal beams, all of the lifting appliances except the light-duty service crane share both the main bearing housing securements and the gearbox pillow blocks as mounting structures in the nacelle. The light-duty service crane shares a gearbox pillow block with the other lifting appliances.

The lifting appliance support base 100 further comprises a front transverse beam 112 and a rear transverse beam 113. The front transverse beam 112 rests on top of and straddles the first and second longitudinal beams 106, 107, respectively, at a location to the rear of the first and second main bearing supports 108, 110, respectively. The rear transverse beam 113 rests on top of and straddles the first and second longitudinal beams 106, 107, respectively, at a location forward of the first and second pillow block bridges 102, 104, respectively. A hydraulic power unit mount 114 to permit mounting of a hydraulic power unit to operate the lifting appliances is mounted on the second longitudinal beam 107 forward of the front transverse beam 112 and over the second main bearing support 110. The hydraulic power unit mount could be mounted on the first longitudinal beam 106, if desired.

The lifting appliance support base 100 further comprises a medium-duty crane base 116, which supports the medium-duty knuckle-boom crane 40. The medium-duty crane base 116 is mounted on the second longitudinal beam 107 forward of the second pillow block bridge 104 and rearward of the rear transverse beam 113. The medium-duty crane base 116 comprises a 4-pin connection for connecting a pedestal 41 (see FIG. 7B and FIG. 7C) of the medium-duty knuckle-boom crane 40 to the medium-duty crane base 116. The lifting appliance support base 100 further comprises first, second and third pinned connections 117, 118, 119, respectively, for mounting the heavy-duty jib crane 50 on the lifting appliance support base 100. The pinned connections 117, 118, 119 all comprise flanges with two spaced apart plates with aligned apertures for accepting pins therethrough, the pins passing through corresponding apertures in corresponding flanges on the heavy-duty jib crane 50. Finally, the lifting appliance support base 100 further comprises a rotor lock 120 and a main shaft clamp 121 for preventing rotational and translational movement of the main shaft during an installation or repair procedure of a wind turbine component.

While the parts of the lifting appliance support base 100 are described above with reference to FIG. 2A to FIG. 2C, assembly of the appliance support base parts and mounting of the various lifting appliances occur in an order that permits the lifting of heavier and heavier objects as the lift system 80 is assembled in the nacelle 2 atop the wind turbine 1.

With reference to FIG. 3A to 3E, first and second pillow block bridges 102, 104 are first to be installed, which is accomplished by removing the top portions of the forward gearbox pillow blocks 12a and bolting the pillow block bridges 102, 104 to the lower portions of the forward gearbox pillow blocks 12a. The light-duty crane base 101 is then attached atop the first pillow block bridge 102, and the light-duty service crane 30 is mounted on the light-duty crane base 101.

Figure 4B:
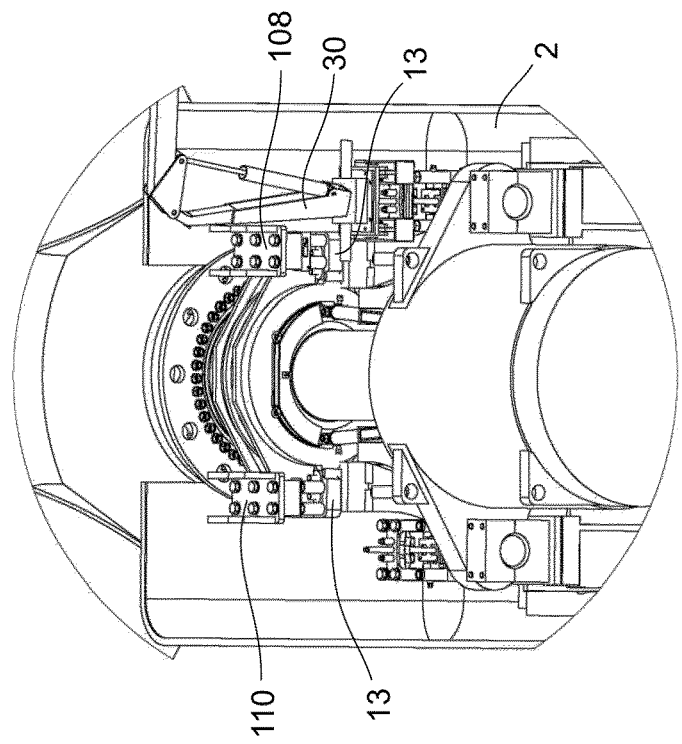
FIG. 4B depicts a rear perspective view of FIG. 4A.
Figure 4A:
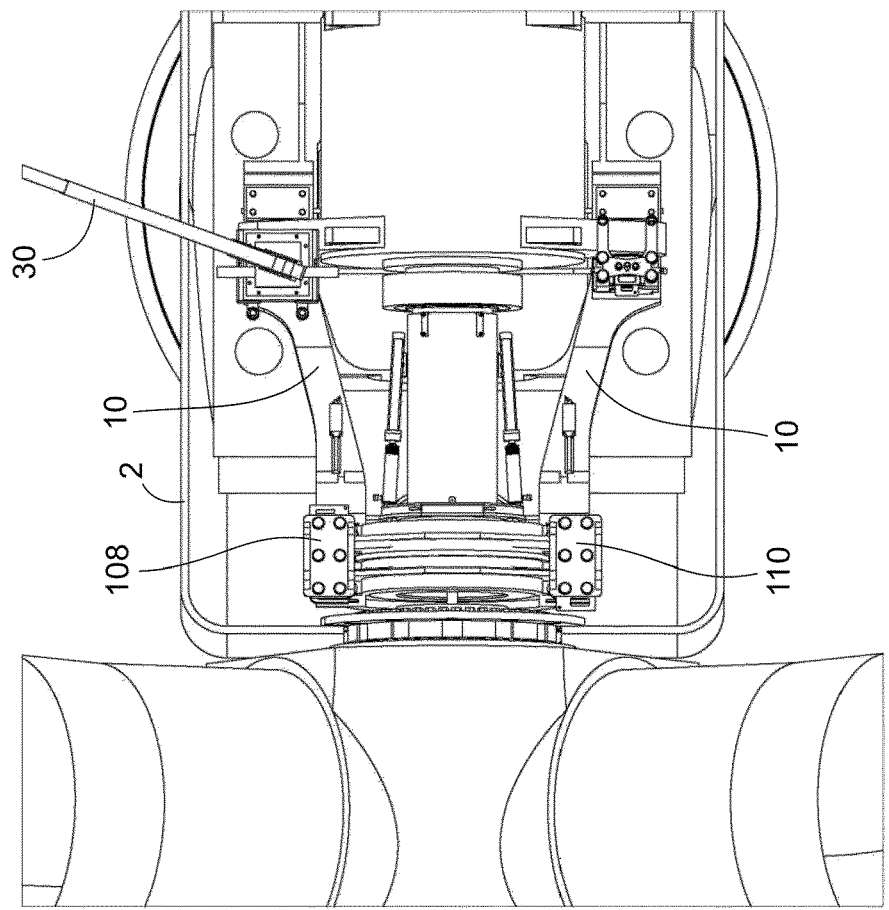
FIG. 4A depicts a top view of the wind turbine of FIG. 3A having further parts of the lifting appliance support base of FIG. 2A mounted in the nacelle.

With reference to FIG. 4A to FIG. 4B, the next step is to use the light-duty service crane 30 to raise the first and second main bearing supports 108, 110, respectively, up to the nacelle 2, where the first and second main bearing supports 108, 110 are bolted to the main bearing housing securements 13.

With reference to FIG. 5A to FIG. 5B, the next step is to use the light-duty service crane 30 to raise the first and second longitudinal beams 106, 107, respectively, the main shaft clamp 121 and the rotor lock 120 up to the nacelle 2, where the longitudinal beams 106, 107 are set on the first and second main bearing supports 108, 110 and on the lower portions of the forward gearbox pillow blocks 12a. The longitudinal beams 106, 107 are secured by pinning to the first and second main bearing supports 108, 110 and clamping to the forward gearbox pillow blocks 12a. The rotor lock 120 is mounted at the front ends of the longitudinal beams 106, 107 using clamps 122, and the main shaft clamp 121 is mounted proximate rear ends of the longitudinal beams 106, 107 using pinned connections.

Figure 6B:
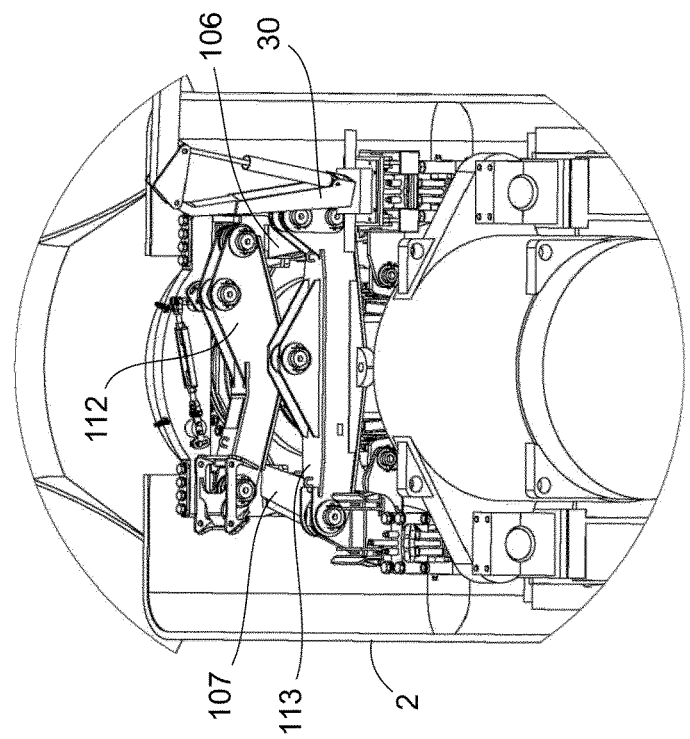
FIG. 6B depicts a rear perspective view of FIG. 6A.
Figure 6A:
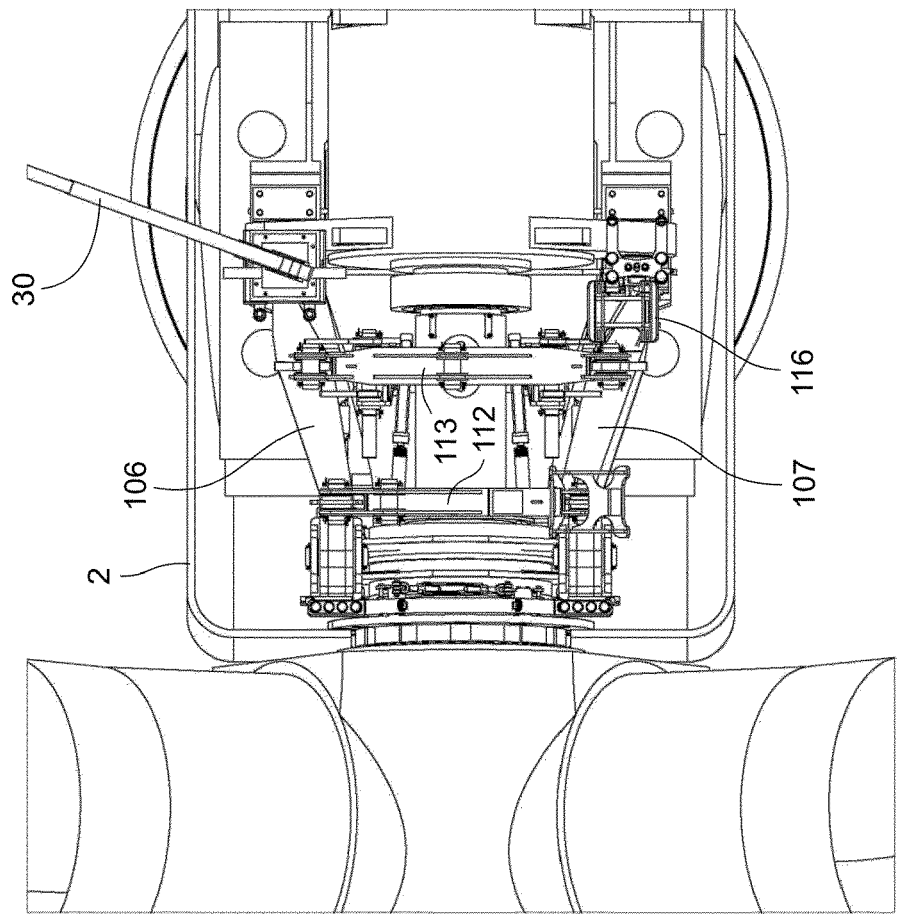
FIG. 6A depicts a top view of the wind turbine of FIG. 5A having all parts of the lifting appliance support base of FIG. 2A mounted in the nacelle.
Figure 8A:
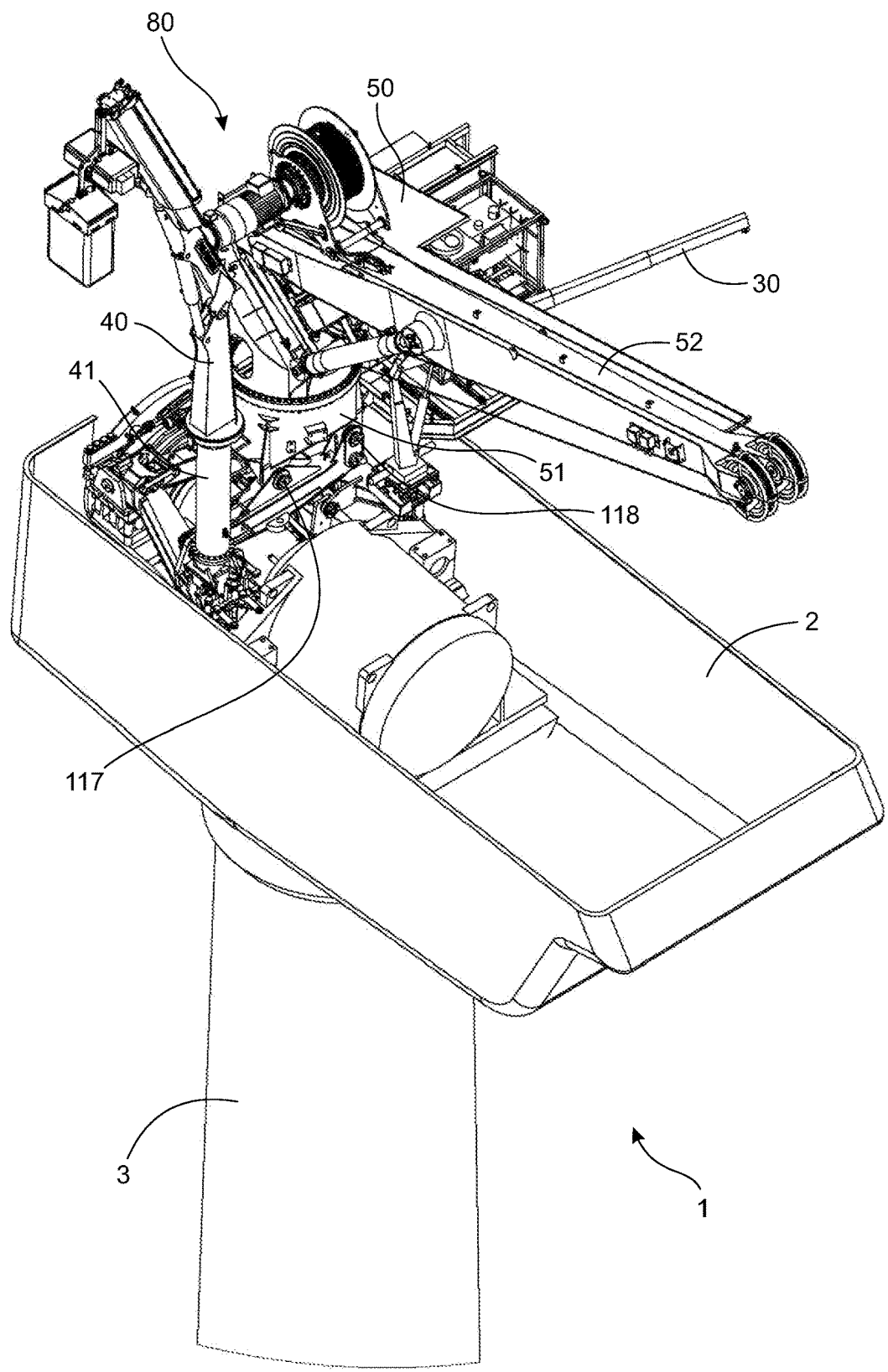
FIG. 8A depicts a rear right side perspective view of the wind turbine of FIG. 1A having the lifting appliance support base of FIG. 2A mounted in the nacelle with the light-duty service crane, the medium-duty knuckle-boom crane and a heavy-duty jib crane mounted in the nacelle to form a single lift system.
Figure 8B:
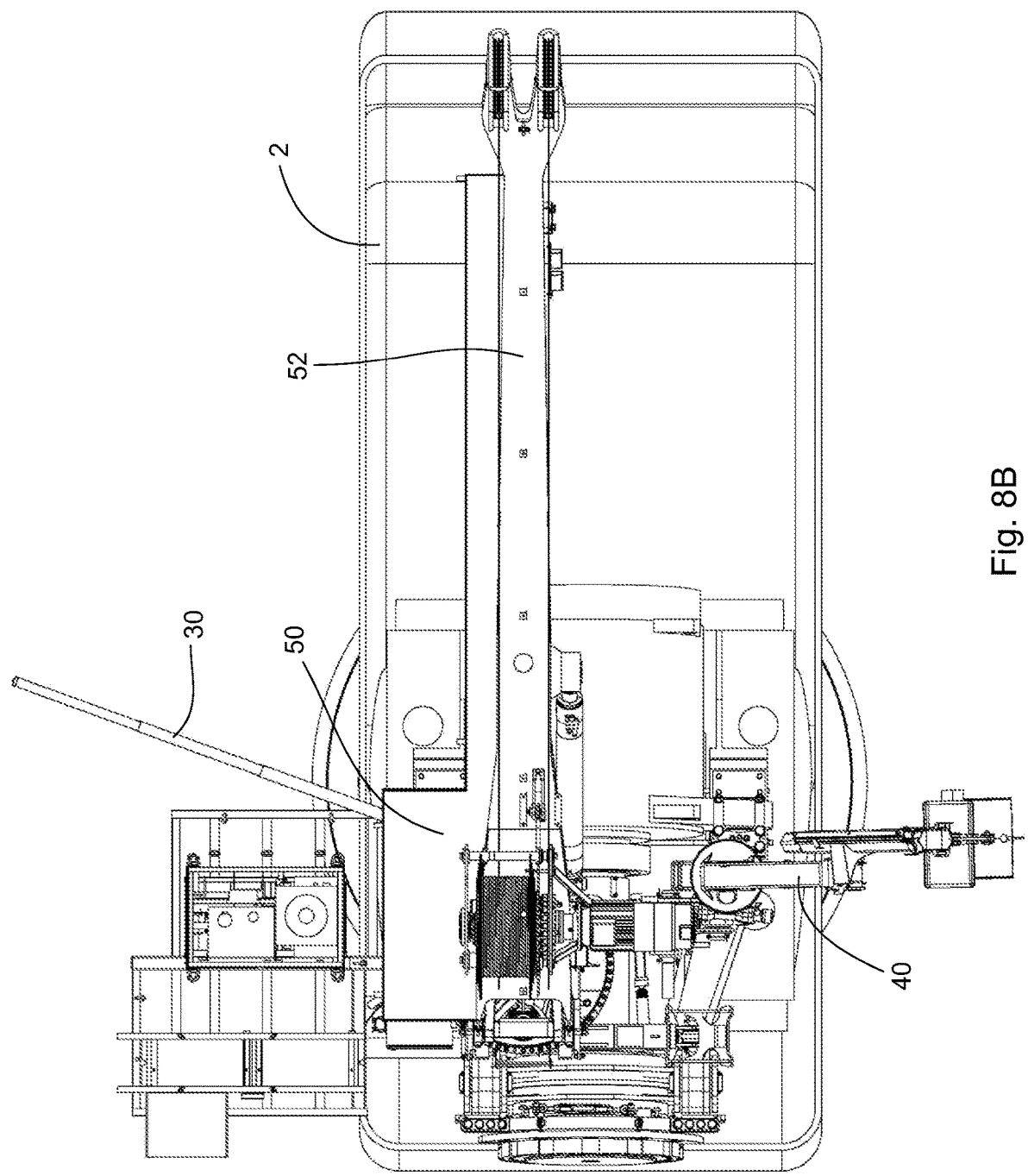
FIG. 8B depicts a top view of the wind turbine of FIG. 8A.
Figure 8C:
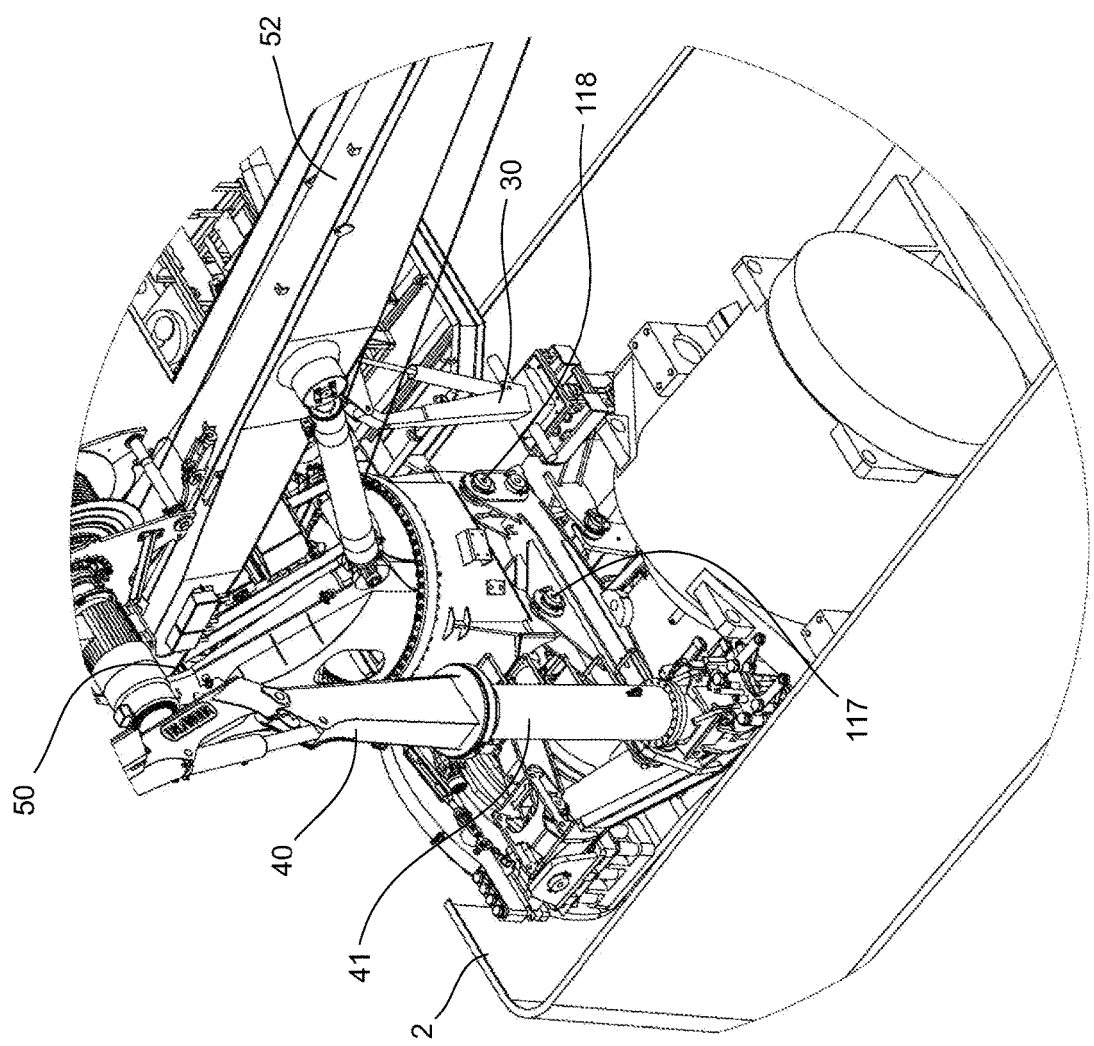
FIG. 8C depicts a rear right side perspective view of the wind turbine of FIG. 8A magnified in the region showing the gearbox, main shaft and main bearing.
Figure 8D:
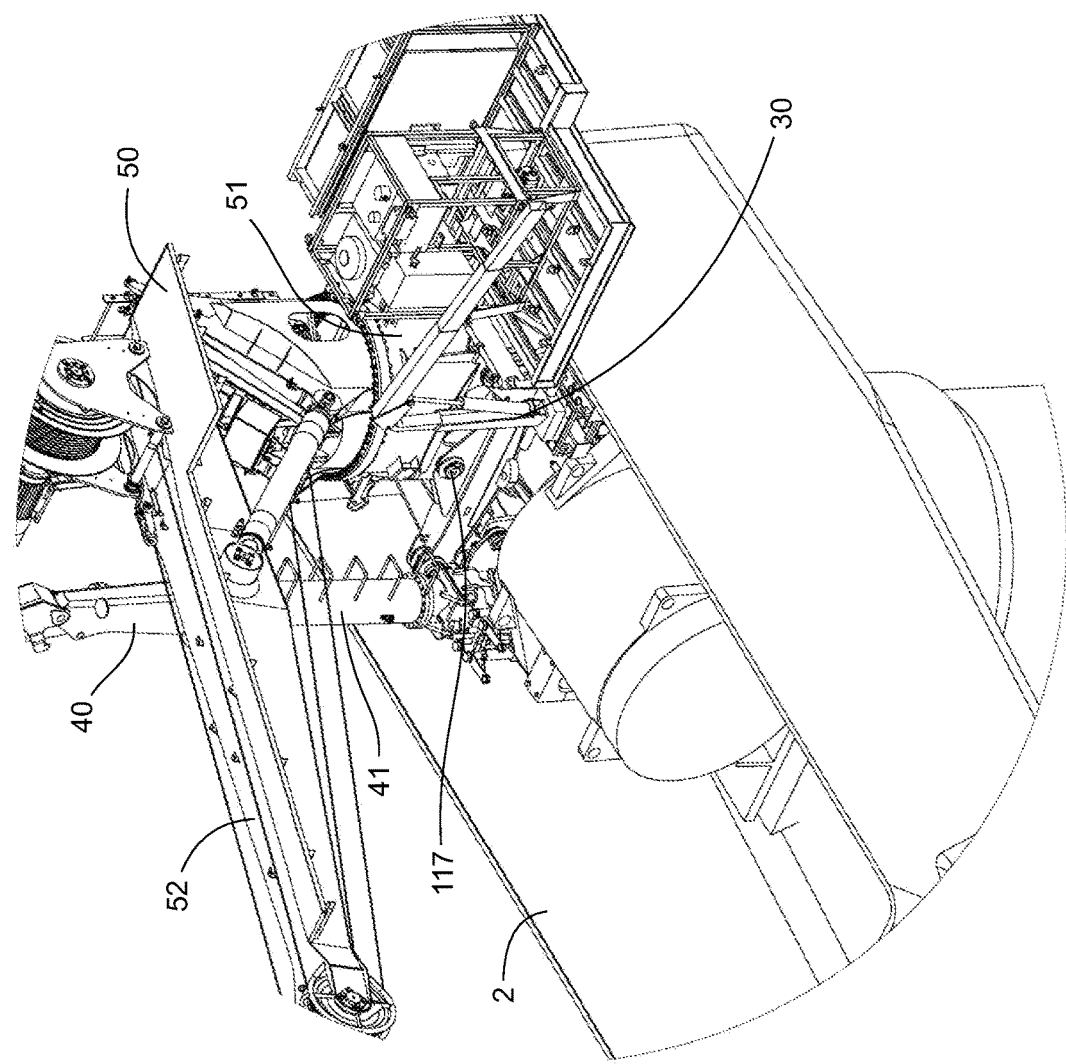
FIG. 8D depicts a rear left side perspective view of the wind turbine of FIG. 8A magnified in the region showing the gearbox, main shaft and main bearing.
Figure 8E:
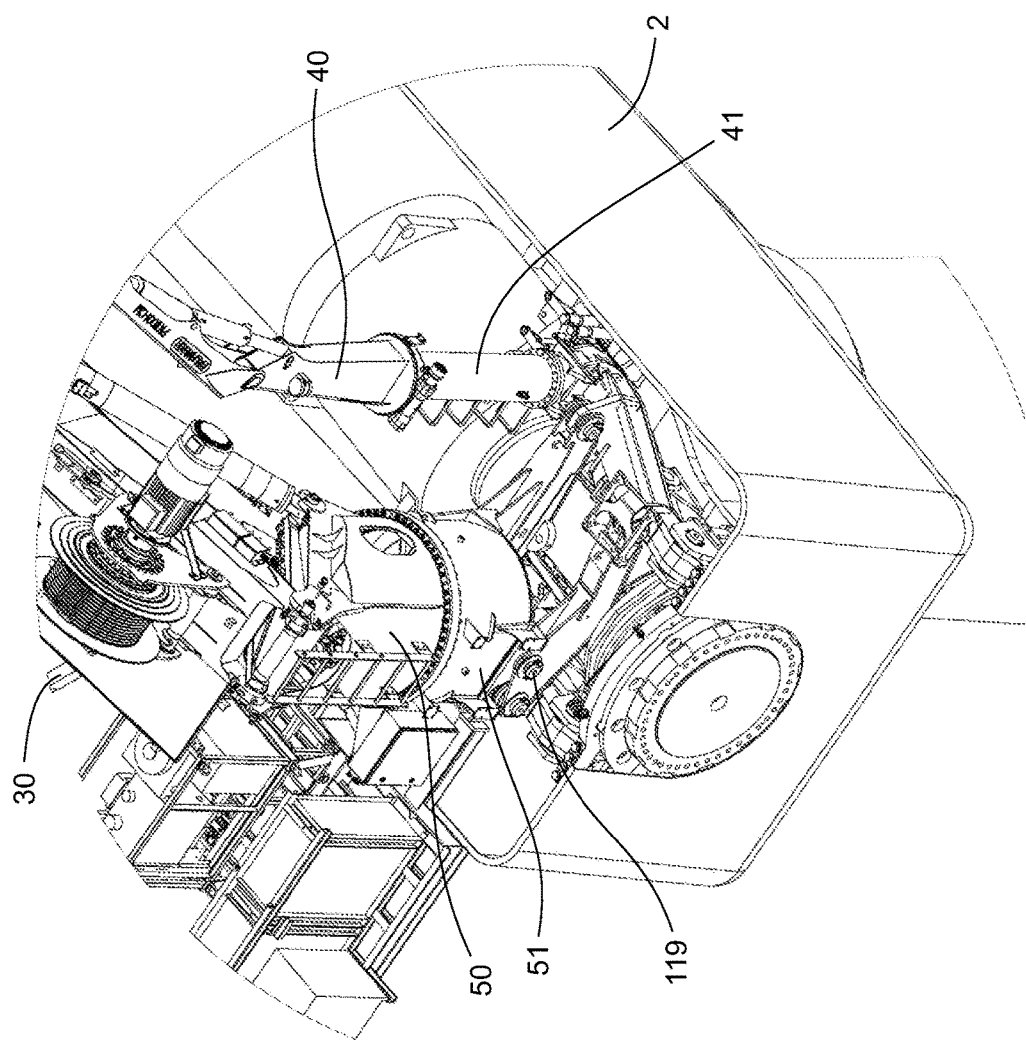
FIG. 8E depicts a front right side perspective view of the wind turbine of FIG. 8A magnified in the region showing the gearbox, main shaft and main bearing with a rotor omitted.

With reference to FIG. 6A to FIG. 6B, the next step is to use the light-duty service crane 30 to raise the front and rear transverse beams 112, 113, respectively, up to the nacelle 2, where the transverse beams 112, 113 are installed transversely across the longitudinal beams 106, 107. The transverse beams 112, 113 may be secured to the longitudinal beams 106, 107, if desired.

With reference to FIG. 7A to FIG. 7B, the next step is to use the light-duty service crane 30 to raise parts of the medium-duty knuckle-boom crane 40 up to the nacelle 2. The pedestal 41 is raised first and secured to the medium-duty crane base 116 by the 4-pin connection. Then, the knuckle-boom is raised by the light-duty service crane 30 and secured to the pedestal 41 by pinned connections. The light-duty service crane 30 is also used to hold and stabilize the parts of the medium-duty knuckle-boom crane 40 while the medium-duty knuckle-boom crane 40 is being mounted.

With reference to FIG. 8A to FIG. 8E, the next step is to use the medium-duty knuckle-boom crane 40 to raise up the parts of the heavy-duty jib crane 50 to the nacelle 2, and to hold and stabilize the parts during installation. A jib crane base 51 is raised first and secured to the first and second transverse beams 112, 113, respectively, by pins at the pinned connections 117, 118, 119. A jib 52 of the heavy-duty jib crane 50 is then raised up and secured to the jib crane base 51 by pinned connections. Assembling the heavy-duty jib crane 50 completes the multiple-appliance lift system 80 mounted in the nacelle 2 of the wind turbine 1.

The lift system 80 has three lifting appliances (i.e. the light-duty service crane 30, the medium-duty knuckle-boom crane 40 and the heavy-duty jib crane 50) that share the forward gearbox pillow blocks 12a as mounting points in the nacelle 2. The lift system 80 has two lifting appliances (i.e. the medium-duty knuckle-boom crane 40 and the heavy-duty jib crane 50) that share both the main bearing housing securements 13 and the forward gearbox pillow blocks 12a as mounting points in the nacelle 2. Sharing of the main bearing housing securements 13 and the forward gearbox pillow blocks 12a as mounting points is accomplished through the use of the lifting appliance support base 100, which is supported on the main bearing housing securements 13 and the forward gearbox pillow blocks 12a, the lifting appliance support base 100 in turn supporting both the medium-duty knuckle-boom crane 40 and the heavy-duty jib crane 50.

Figure 9A:
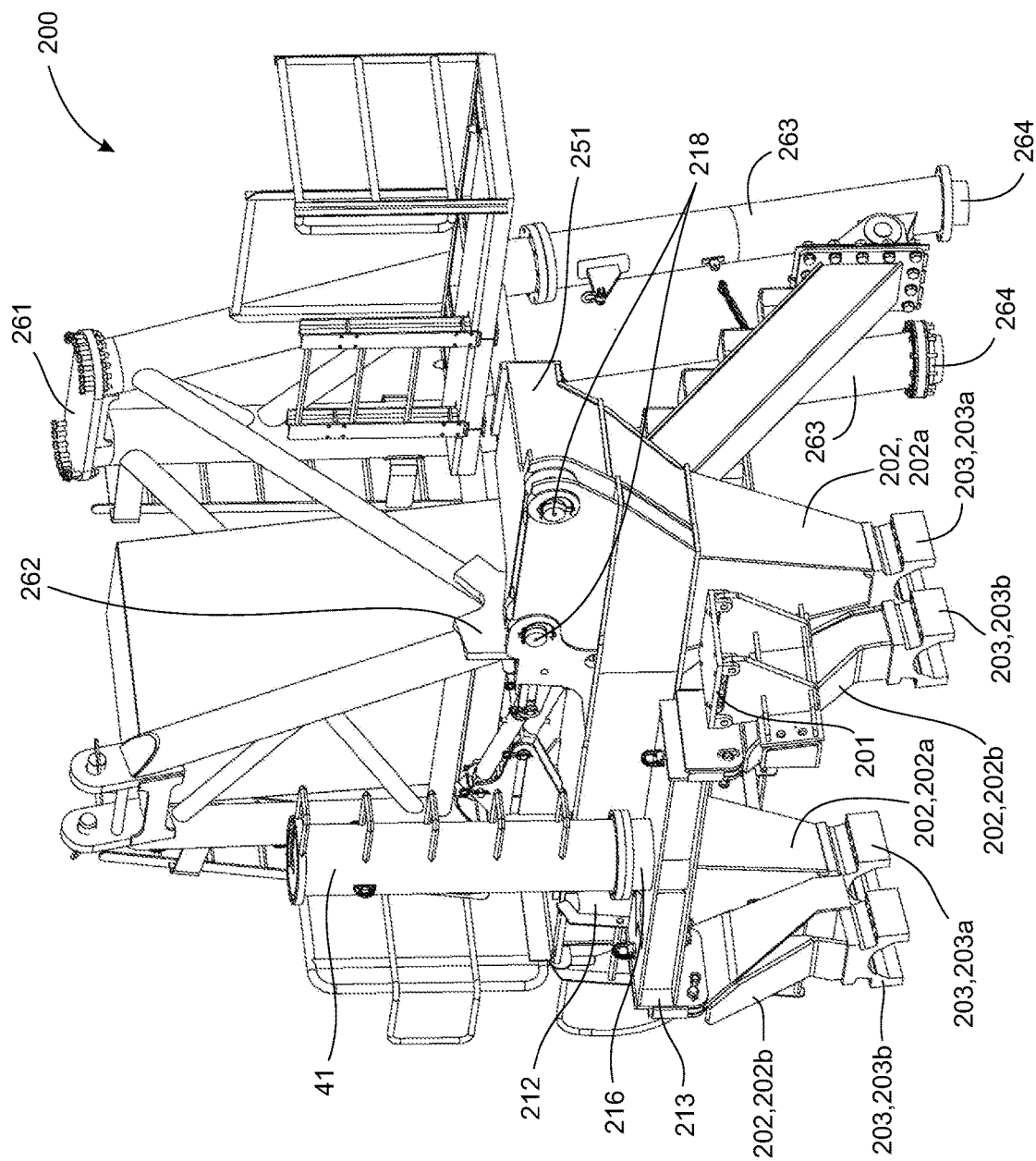
FIG. 9A depicts a perspective view of an alternative embodiment of a lifting appliance support base mountable in the nacelle of a wind turbine and capable of additionally supporting a super heavy-duty boom hoist in the nacelle.
Figure 9B:
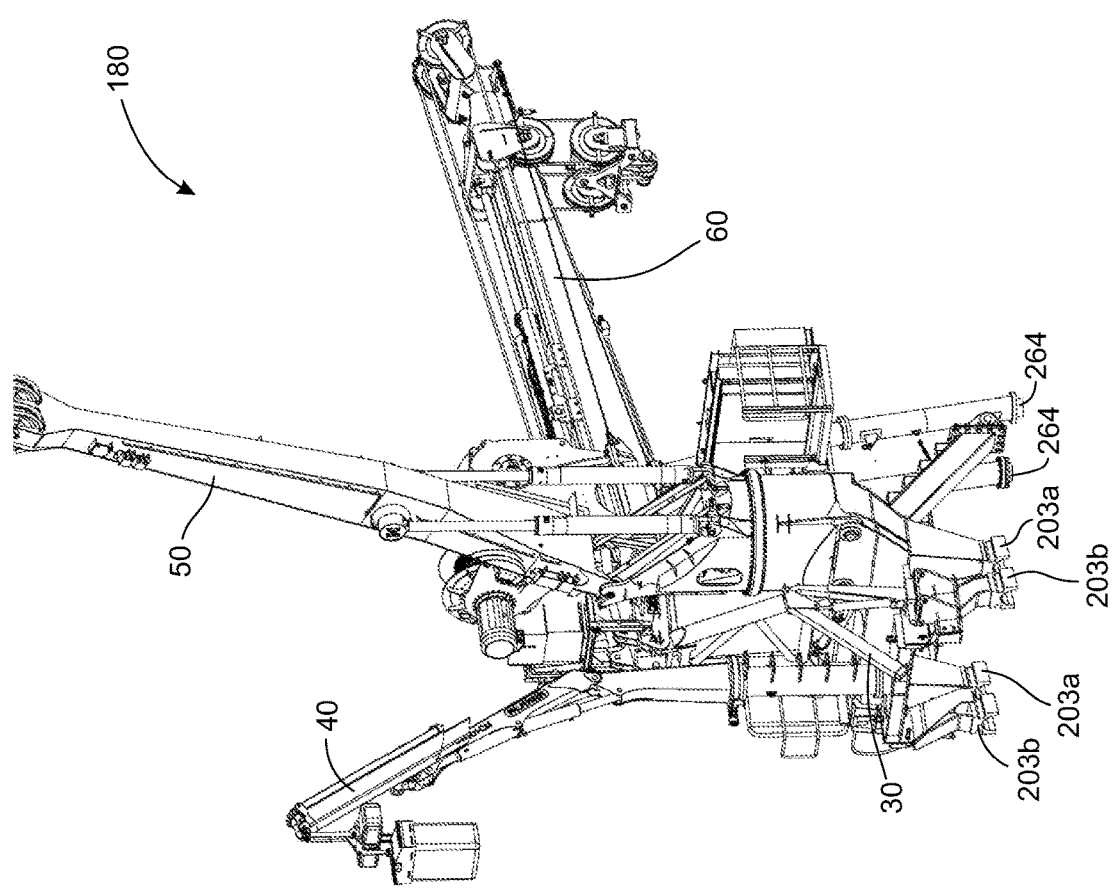
FIG. 9B depicts a perspective view of the lifting appliance support base of FIG. 9A having the light-duty service crane, the medium-duty knuckle-boom crane, the heavy-duty jib crane and the super heavy-duty boom hoist mounted thereon to form an alternative single lift system; and, FIG. 9C, FIG. 9D, FIG. 9E, and FIG. 9F serially illustrate how the lifting appliance support base of FIG. 9A is assembled in the nacelle together with the light-duty service crane, the medium-duty knuckle-boom crane, the heavy-duty jib crane and the super heavy-duty boom hoist to assemble the single lift system of FIG. 9B.

FIG. 9A to FIG. 9F illustrate an alternative multiple-appliance lift system 180 mountable in the nacelle 2 of the wind turbine 1, the system 180 comprising four lifting appliances, namely the light-duty service crane 30, the medium-duty knuckle-boom crane 40, the heavy-duty jib crane 50 and a super heavy-duty boom hoist 60, as shown in FIG. 9B. To be able to install the multiple lifting appliances in the nacelle 2, an alternative embodiment of a lifting appliance support base 200 is mounted in the nacelle 2. The lifting appliance support base 200 comprises a plurality of parts that are installed in a particular order along with the various lifting appliances. FIG. 9A illustrates the parts of the lifting appliance support base 200, while FIG. 9C to FIG. 9F illustrate the order in which the parts of the lifting appliance support base 200 and the various lifting appliances are mounted in the nacelle 2 to assemble a single multiple-appliance lift system 180.

With reference to FIG. 9A, the lifting appliance support base 200 is designed to be supported in the nacelle 2 in the forward yaw drive pockets 15a in the bedplate 10, and on both the forward gearbox pillow blocks 12a and the rearward gearbox pillow blocks 12b (see FIG. 1A and FIG. 1D).

The lifting appliance support base 200 comprises four vertically oriented pillow block bridges 202 comprising two forward pillow block bridges 202a and two rearward pillow block bridges 202b. The pillow block bridges 202 each comprise a bridge foot 203 at the bottom end of each of the pillow block bridges 202 for bolted connection to lower portions of the gearbox pillow blocks 12. The forward pillow block bridges 202a comprise forward bridge feet 203a and the rearward pillow block bridges 202b comprise rearward bridge feet 203b. Mounted on one of the rearward pillow block bridges 202b is a light-duty crane base 201 on which the light-duty service crane 30 can be mounted. A rear transverse beam 213 extends transversely between and is connected to upper portions of the two rearward pillow block bridges 202b. A medium-duty crane base 216 is fixedly supported on the rear transverse beam 213, the medium-duty crane base 216 providing a mount for the pedestal 41 of the medium-duty knuckle-boom crane 40. A forward transverse beam 212 extends transversely between and is connected to upper portions of the two forward pillow block bridges 202a. Fixedly mounted at one end of the forward transverse beam 212 is a heavy-duty crane base 251 to which the heavy-duty jib crane 50 can be mounted. The heavy-duty crane base 251 is provided with pinned connections 218 (only two labeled) to secure the heavy-duty jib crane 50 to the heavy-duty crane base 251. Also fixedly mounted on the forward transverse beam 212 is a frame structure 262 of a super heavy-duty crane base 261, the super heavy-duty crane base 261 providing a mount for the super heavy-duty boom hoist 60. The super heavy-duty crane base 261 also comprises two vertically oriented support pillars 263 to which the frame structure 262 is connected. The support pillars 263 comprise yaw drive pocket inserts 264 at the bottom ends support pillars 263 for insertion in to the forward yaw drive pockets 15a in the bedplate 10 of the nacelle 2.

The lifting appliance support base 200 thereby supports the light-duty service crane 30, the medium-duty knuckle-boom crane 40 and the heavy-duty jib crane 50 on the gearbox pillow blocks 12, while supporting and the super heavy-duty boom hoist 60 on both the gearbox pillow blocks 12 and in the yaw drive pockets 15.

While the parts of the lifting appliance support base 200 and the lift system 180 are described above with reference to FIG. 9A and FIG. 9B, assembly of the appliance support base parts and mounting of the various lifting appliances occur in an order that permits the lifting of heavier and heavier objects as the lift system 180 is assembled in the nacelle 2 atop the wind turbine 1.

Figure 9C:
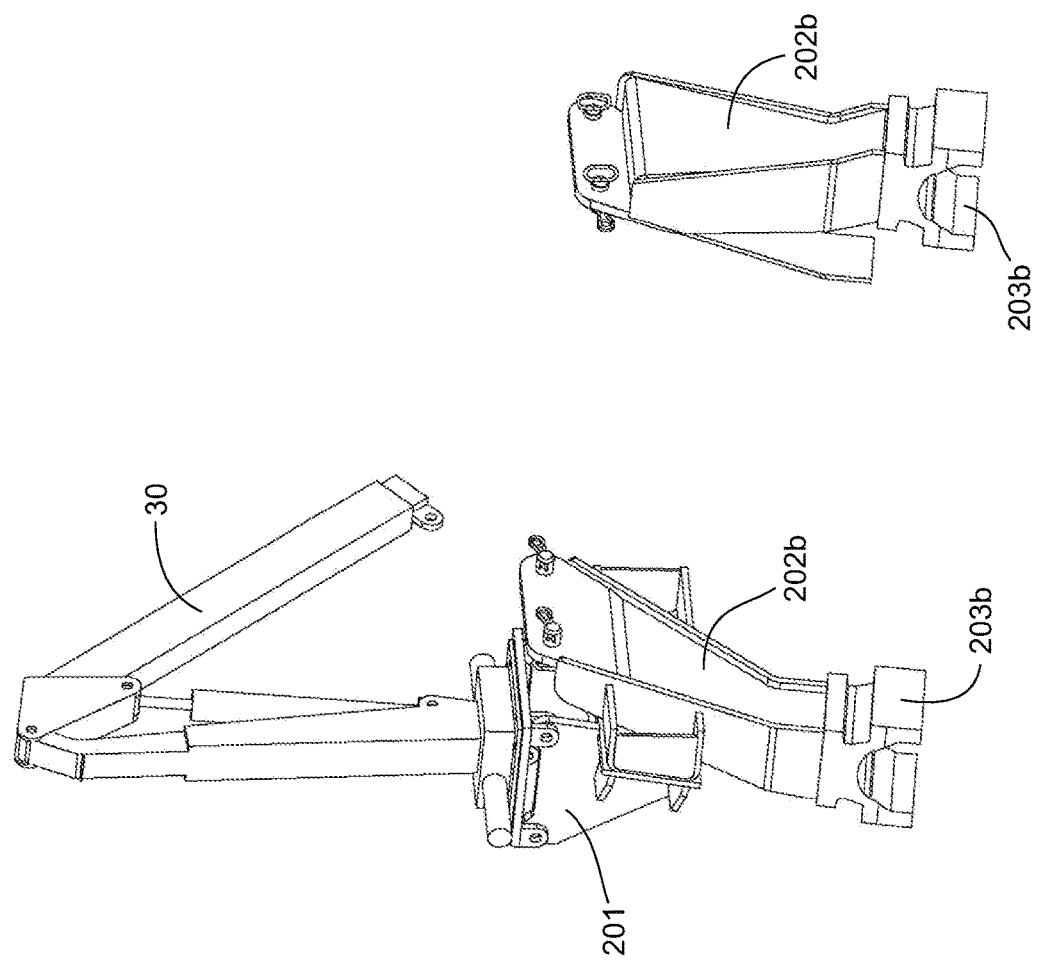

With reference to FIG. 9C, the rear pillow block bridges 202b are first to be installed, which is accomplished by removing the top portions of the rearward gearbox pillow blocks 12b and bolting the rear pillow block bridges 202b to the lower portions of the rearward gearbox pillow blocks 12b. The light-duty crane base 201 is then attached atop one of the pillow block bridge 202b, and the light-duty service crane 30 is mounted on the light-duty crane base 201. An existing nacelle-mounted service crane in the wind turbine may be utilized to lift the rear pillow block bridges 202b, the light-duty crane base 201 and the light-duty service crane 30 up to the nacelle.

Figure 9D:
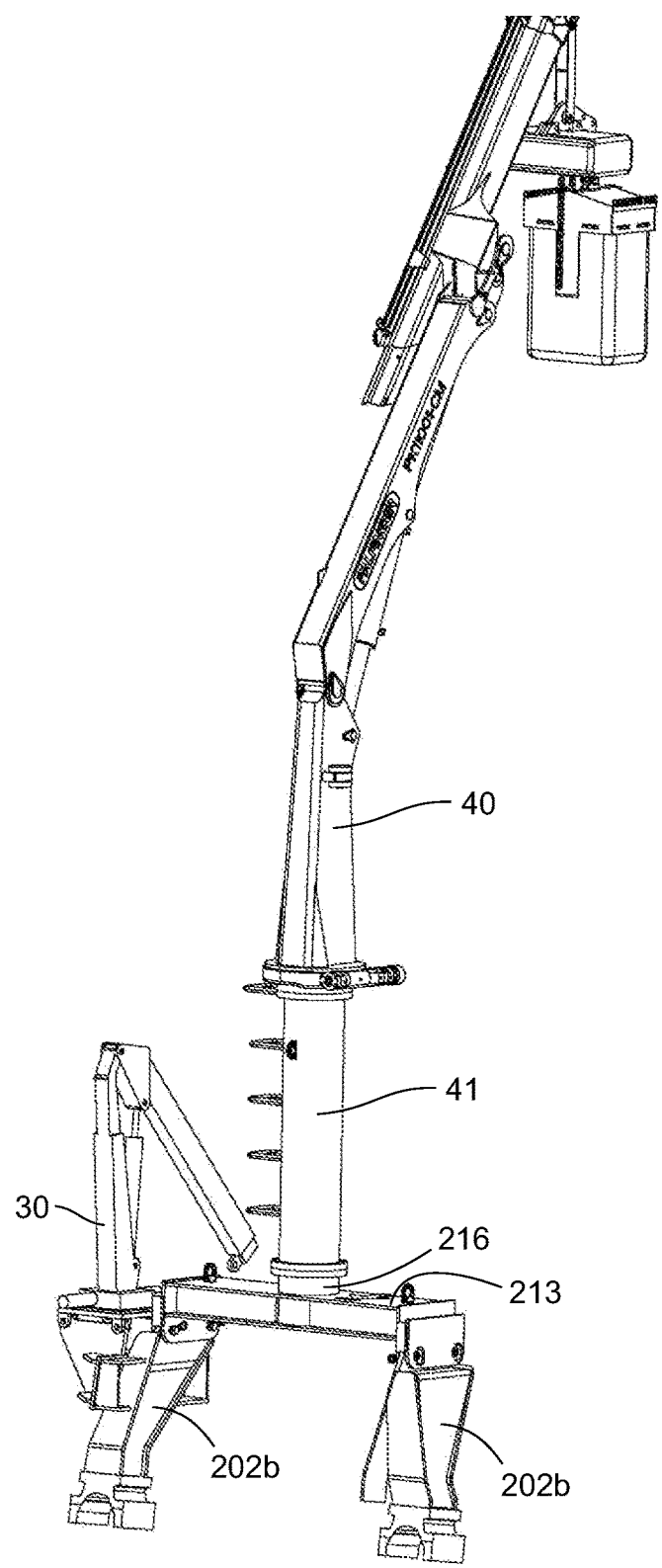

With reference to FIG. 9D, the rear transverse beam 213 having the medium-duty crane base 216 fixed thereon is then lifted up to the nacelle by the light-duty service crane 30 and installed between the rear pillow block bridges 202b. The light-duty service crane 30 is then used to lift the pedestal 41 of the medium-duty knuckle-boom crane 40, which is installed on the medium-duty crane base 216. The light-duty service crane 30 is then used to lift the remaining parts of the medium-duty knuckle-boom crane 40, which is installed on the pedestal 41. The light-duty service crane 30 can be used to hold and stabilize objects as required.

Figure 9E:
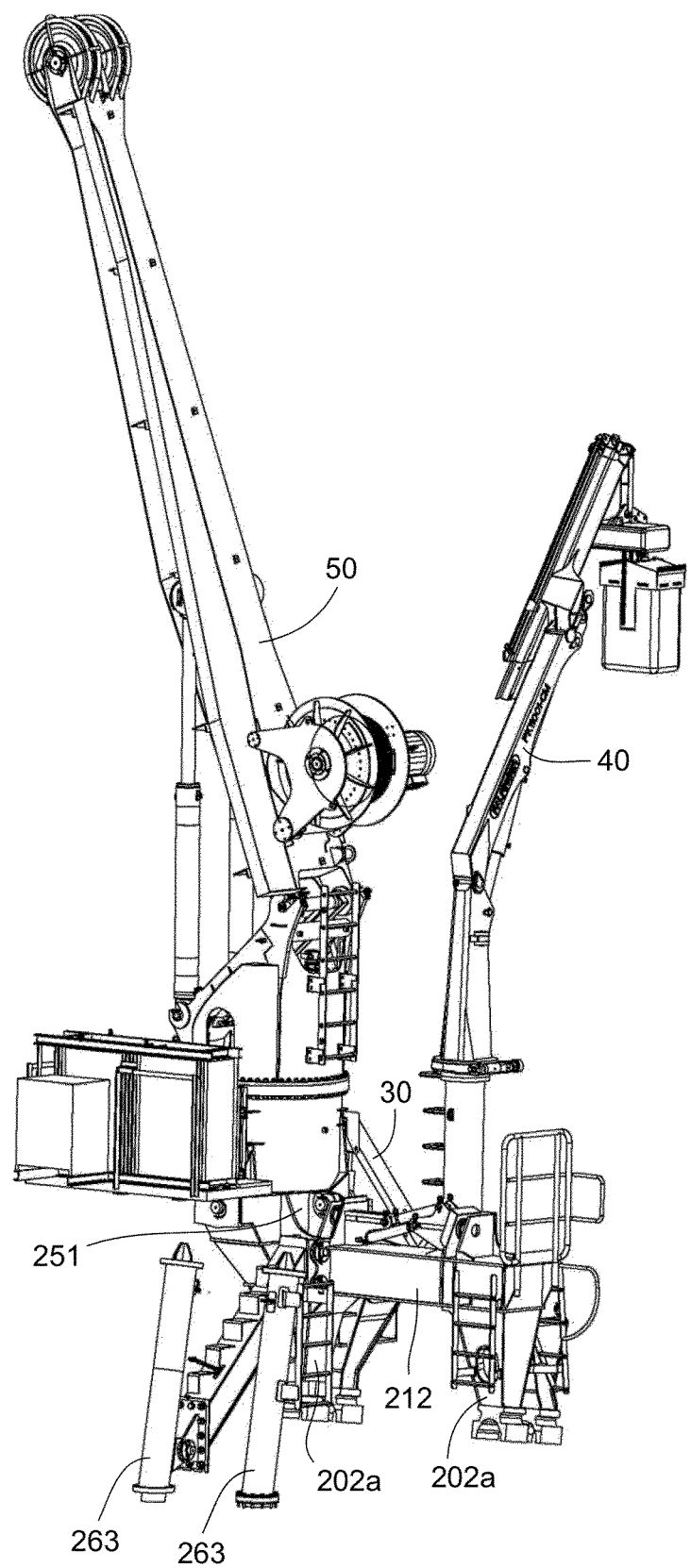

With reference to FIG. 9E, the medium-duty knuckle-boom crane 40 is then used to lift up the forward pillow block bridges 202a, which are installed on the forward gearbox pillow blocks 12a, and then the medium-duty knuckle-boom crane 40 is also used to lift up the forward transverse beam 212 with the heavy-duty crane base 251 thereon, the forward transverse beam 212 then being mounted between the forward pillow block bridges 202a. The medium-duty knuckle-boom crane 40 is then used to lift up the support pillars 263, which are mounted in the forward yaw drive pockets 15a. The medium-duty knuckle-boom crane 40 is then used to lift up the parts of the heavy-duty jib crane 50, which is mounted on the heavy-duty crane base 251. Both the light-duty service crane 30 and the medium-duty knuckle-boom crane 40 can be used to hold and stabilize objects as required.

Figure 9F:
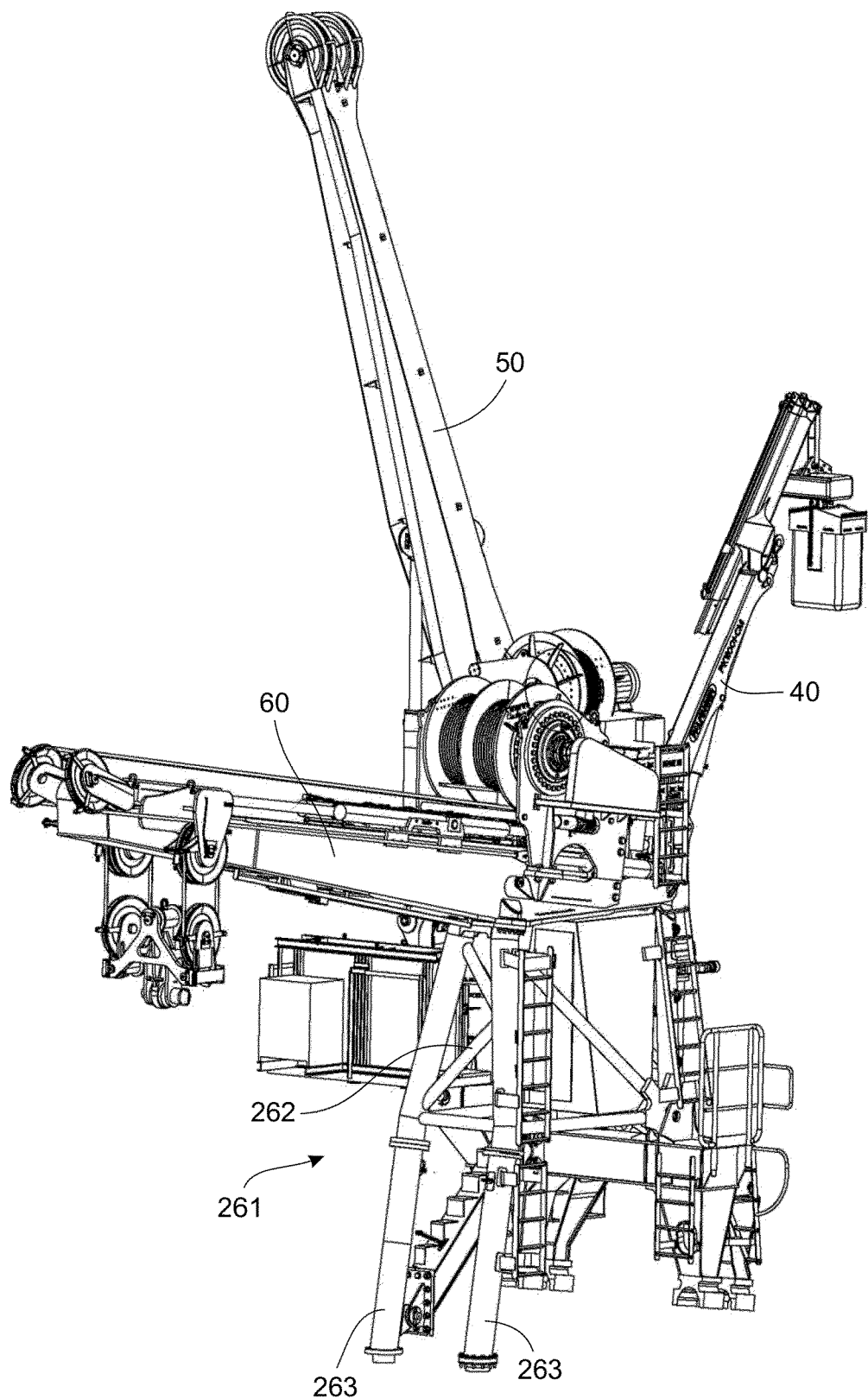

With reference to FIG. 9F, the heavy-duty jib crane 50 is then used to lift up the remaining parts of the lifting appliance support base 200, including the frame structure 262, as well as the super heavy-duty boom hoist 60. The frame structure 262 is assembled to complete the super heavy-duty crane base 261, and then the super heavy-duty boom hoist 60 is mounted on the super heavy-duty crane base 261. The light-duty service crane 30, medium-duty knuckle-boom crane 40 and heavy-duty jib crane 50 can be used to hold and stabilize objects as required.

The lift system 180 has four lifting appliances (i.e. the light-duty service crane 30, the medium-duty knuckle-boom crane 40, the heavy-duty jib crane 50 and the super heavy-duty boom hoist 60) that share the gearbox pillow blocks 12 as mounting points in the nacelle 2. The lift system 180 has two lifting appliances (i.e. heavy-duty jib crane 50 and the super heavy-duty boom hoist 60) that share the forward gearbox pillow blocks 12a as mounting points in the nacelle 2. The super heavy-duty boom hoist 60 is also supported in the nacelle 2 in the forward yaw drive pockets 15a.

Sharing of gearbox pillow blocks 12 as mounting points is accomplished through the use of the lifting appliance support base 200, which is supported on the forward gearbox pillow blocks 12a, on the rearward gearbox pillow blocks 12b and in the forward yaw drive pockets 15a.

Both the lift system 80 and the alternative lift system 180 may be disassembled by reversing the order of steps.

The novel features will become apparent to those of skill in the art upon examination of the description. It should be understood, however, that the scope of the claims should not be limited by the embodiments, but should be given the broadest interpretation consistent with the wording of the claims and the specification as a whole.

The invention claimed is:

1. A nacelle-mounted multiple-appliance lift system, the lift system comprising:
   a first lifting appliance mounted in a nacelle of a wind turbine on both at least two main bearing housing securements and at least two gearbox pillow blocks; and,
   a second lifting appliance mounted in the nacelle of the wind turbine on both the at least two main bearing housing securements and the at least two gearbox pillow blocks,
   the first and second lifting appliances sharing both the at least two main bearing housing securements and the at least two gearbox pillow blocks,
   wherein the first and second lifting appliances are mounted on a common support mounted on both the at least two main bearing housing securements and the at least two gearbox pillow blocks, the common support bearing weight of both the first and second lifting appliances,
   wherein the common support comprises:
   at least two pillow block bridges secured to the at least two gearbox pillow blocks and spaced apart transversely in the nacelle;
   at least two main bearing supports secured to the at least two main bearing housing securements and spaced apart transversely in the nacelle;
   at least two longitudinal beams extending between and supported on the at least two main bearing supports and the at least two gearbox pillow blocks;
   at least two longitudinally spaced apart transverse beams secured to and connecting the at least two longitudinal beams, the at least two transverse beams situated longitudinally between the at least two pillow block bridges and the at least two main bearing supports; and, at least two support bases for supporting the lifting appliances, each of the at least two support bases mounted on at least one of the longitudinal beams or at least one of the transverse beams.

2. The lift system of claim 1, further comprising a third lifting appliance mounted in the nacelle on at least one of the main bearing housing securements, at least one of the gearbox pillow blocks, a dedicated mounting platform, a bedplate, a torque arm, a generator housing or any combination thereof.

3. The lift system of claim 1, further comprising a third lifting appliance mounted on at least one of the gearbox pillow blocks.

4. The lift system of claim 1, wherein the common support comprises:
   a first pair of vertically oriented pillow block bridges secured to the gearbox pillow blocks and spaced apart transversely in the nacelle; and,
   a second pair of vertically oriented pillow block bridges secured to the gearbox pillow blocks and spaced apart transversely in the nacelle.

5. The lift system of claim 1, wherein the common support comprises:
   a first transverse beam secured to and connecting the first pair of the transversely spaced apart pillow block bridges; and,
   a second transverse beam secured to and connecting the second pair of the transversely spaced apart pillow block bridges.

6. The lift system of claim 1, wherein the common support comprises:
   a first pair of vertically oriented pillow block bridges secured to the gearbox pillow blocks and spaced apart transversely in the nacelle;
   a first transverse beam secured to and connecting the first pair of the transversely spaced apart pillow block bridges;
   at least one first support base for supporting at least one of the lifting appliances, the at least one first support base mounted on the first transverse beam;
   a second pair of vertically oriented pillow block bridges secured to the gearbox pillow blocks and spaced apart transversely in the nacelle;
   a second transverse beam secured to and connecting the second pair of the transversely spaced apart pillow block bridges; and,
   at least one second support base for supporting at least one of the lifting appliances, the at least one second support base mounted on the second transverse beam.

* * * * *